US011201794B1

(12) United States Patent
Guo et al.

(10) Patent No.: US 11,201,794 B1
(45) Date of Patent: Dec. 14, 2021

(54) EDGE FEDERATION SYSTEM FOR AN INTEGRATED SERVICE PROVISIONING MODEL AND METHOD THEREOF

(71) Applicant: Deke Guo, Hunan (CN)

(72) Inventors: Deke Guo, Hunan (CN); Guoming Tang, Hunan (CN); Lailong Luo, Hunan (CN); Xiaofeng Cao, Hunan (CN); Yan Li, Hunan (CN)

(73) Assignee: NATIONAL UNIVERSITY OF DEFENSE TECHNOLOGY, Changsha (CN)

( * ) Notice: Subject to any disclaimer, the term of this patent is extended or adjusted under 35 U.S.C. 154(b) by 0 days.

(21) Appl. No.: 17/339,840

(22) Filed: Jun. 4, 2021

(51) Int. Cl.
*H04L 12/24* (2006.01)
*H04L 12/26* (2006.01)

(52) U.S. Cl.
CPC ........ *H04L 41/142* (2013.01); *H04L 41/5009* (2013.01); *H04L 41/5054* (2013.01); *H04L 43/04* (2013.01); *H04L 43/062* (2013.01)

(58) Field of Classification Search
CPC . H04L 41/12; H04L 41/0893; H04L 41/5051; H04L 41/042; H04L 41/142; H04L 41/5009; H04L 41/5054
See application file for complete search history.

(56) References Cited

U.S. PATENT DOCUMENTS

| | | | |
|---|---|---|---|
| 10,866,836 B1* | 12/2020 | Guo | H04L 41/5051 |
| 11,032,164 B1* | 6/2021 | Rothschild | H04L 41/5025 |
| 2007/0067440 A1* | 3/2007 | Bhogal | H04L 67/34 709/224 |
| 2018/0139726 A1* | 5/2018 | Choi | H04L 67/1082 |
| 2019/0141120 A1* | 5/2019 | Bernat | H04L 67/327 |
| 2019/0391855 A1* | 12/2019 | Bernat | G06F 9/4862 |
| 2020/0112487 A1* | 4/2020 | Inamdar | H04L 41/082 |
| 2020/0244722 A1* | 7/2020 | Jeuk | H04L 43/08 |
| 2020/0336376 A1* | 10/2020 | Mahdi | G06N 3/006 |
| 2021/0021431 A1* | 1/2021 | Guim Bernat | H04L 9/3215 |
| 2021/0135983 A1* | 5/2021 | Farnham | H04L 63/0807 |

* cited by examiner

*Primary Examiner* — Shean Tokuta
(74) *Attorney, Agent, or Firm* — Dragon Sun Law Firm, PC; Jinggao Li, Esq.

(57) ABSTRACT

The present disclosure relates to an edge federation system, wherein the edge federation system includes: an end device; an edge service provider (ESP) configured to contract services from the end device; an edge infrastructure provider (EIP) configured to provide edge computing resources to the contracted services from the ESP; a cloud server configured to provide service to the end device; and a consortium for managing resources between the EIP and the cloud server, wherein the consortium is further configured to calculate available resources of the EIP, calculate available resources of the cloud server, and optimize the distribution of services from the EIP and the cloud server to the end device.

20 Claims, 19 Drawing Sheets

EDGE FEDERATION SYSTEM FOR AN INTEGRATED SERVICE PROVISIONING MODEL AND METHOD THEREOF

TECHNICAL FIELD

The present disclosure relates to the field of edge computing, and more particularly relates to edge federation, resource integration, and an optimal service provisioning solution.

BACKGROUND

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference is individually incorporated by reference. In terms of notation, hereinafter, [n] represents the nth reference cited in the reference list. For example, [1] represents the first reference cited in the reference list, namely, GMSA, "GSMA intelligence," https://www.gsmaintelligence.com/, Accessed On: February 2019.

The emergence of edge computing offers a new paradigm to deliver computation-intensive and latency-critical services to traditional cloud users [1]. The basic idea is to push the cloud service to the network edge (e.g., access points, base stations, or central offices), which is closer to users than the cloud. In this way, users can still exploit the power of cloud computing, while no longer suffering from network congestion and long latency [2]. The prosperous development of edge computing offers an excellent opportunity for service providers, where they can rent resources from edge infrastructure providers (EIPs) to host their services. An EIP usually has to deploy and maintain a set of distributed edge nodes at the network edge, where an edge node can consist of multiple edge servers and be configured with certain computation and storage resources. As the owners of edge nodes, EIPs are responsible for service provisioning and resource management.

Nevertheless, compared with the existing cloud computing solution, edge computing is still constrained in resource capacity and implemented with high costs in maintaining a wide-reaching edge infrastructure [3][4]. Mainly, EIPs tend to establish a series of private edge-computing environments to serve specific requirements of users from the aspect of their own viewpoint [5]. Each EIP only manages and uses its own resources; hence, a standalone edge-computing environment is usually resource-constrained, especially while serving an increasing number of users. When many services need to be deployed in broad geographic areas, the involved EIPs have to deploy and maintain more edge nodes to maintain adequate service coverage, which may result in a large financial overhead. On the other hand, however, different EIPs may build edge nodes in the same place independently without any cooperation, causing unbalanced and under-utilized edge resources. Because an individual EIP has limited information about the entirety of an edge-computing environment, it may be difficult to make global optimizations for efficiently delivering various services to different users. Consequently, inefficient resource management and the service deployment paradigm can severely limit the development of a healthy edge computing ecosystem.

Horizontally, EIPs independently construct and maintain their own private resource infrastructures, which restricts the quick development and spread of edge computing. In the existing model, an EIP usually has a limited number of edge servers, and hence cannot cover broad areas, which may cause long service delivery latency to users outside of covered areas. This would severely limit the market size of each EIP. A straightforward solution for an individual EIP is to build edge servers at more locations. This method, however, would cause a large amount of duplicated edge nodes across EIPs in many sites, leading to increased capital and operational expenditure.

Vertically, cloud computing and edge computing each have their own advantages, but both methods typically struggle to meet the high latency requirement (i.e., low time delay) of services and low-cost resource provisions simultaneously. Although edge computing can achieve much lower latency in service delivery than cloud computing, it also incurs a high deployment cost of new computation and storage infrastructures [6][7]. On the contrary, cloud computing may provide low costs and sufficient resources. Further, as each edge node has a limited range of service areas, the cloud can be an essential complement to support end users in areas not served by edge nodes [8]. Edge computing and cloud computing can reasonably complement each other, with an effective mechanism to cooperate.

Therefore, a heretofore unaddressed need exists in the art to address the aforementioned deficiencies and inadequacies.

SUMMARY

In view of the shortcomings of the existing technology, the present disclosure describes an edge federation, an integrated service provisioning model for the edge computing paradigm. It aims to establish a cost-efficient platform for EIPs and offers end users and edge service providers (ESPs) a transparent resource management scheme by seamlessly integrating individual EIPs and the cloud. As such, interoperability and resource sharing across EIPs may be enabled.

The edge federation provided in the present disclosure brings a new service-provisioning model for a next generation edge-computing network, which may be mutually beneficial for EIPs, ESPs and end users. For EIPs, more effective service deployment and delivery can be achieved with fewer infrastructure constructions, resulting in higher revenue. For ESPs, due to the shared resource pool in edge federation, the market size can be easier to expand, and the reliability of service delivery can be considerably enhanced. To this end, end users can enjoy an improved service experience with lower latency. There may be three critical challenges in the realization of an edge federation. First, an edge-computing network is very complex, consisting of a series of EIPs, diverse services, and heterogeneous end devices. The edge federation designed in the present disclosure can realize the targets of scalability, efficiency, and low latency. Second, the edge federation can effectively model the joint service provisioning process across heterogeneous edge nodes, and across edge and cloud. Third, the service provisioning problem under the edge federation involves a large number of optimization variables and exhibits very high computation complexity. An efficient solution with affordable complexity is needed to deal with the large-scale optimization problem.

An edge federation is described below including an integrated edge computing model to realize transparent service provisioning across independent EIPs and the cloud. The edge federation model is designed to improve the QoE of end users and save the cost of EIPs. The service provisioning process may be characterized under the edge federation as a linear programming (LP) optimization model, and a dimension-shrinking method is provided to reformulate the LP optimization model into a more easily solvable problem. Accordingly, a service provisioning algorithm (SEE) has been developed. The provided solution for edge federation may be evaluated under the base station network of Toronto city with real-world trace. Compared with the fixed contract model and multihoming model, edge federation can reduce the overall cost of EIPs by 23.3% to 24.5%, and 15.5% to 16.3%, respectively.

Edge federation is the platform that spans the continuum of resources of different EIPs, from the cloud to the edge. In a cross-EIP way, edge federation can bring the customized resources (e.g., computation, storage, and networking resources) for ESPs and end users in a broad, fast, and reliable geo-distributed manner.

Resource integration in the edge federation can be more complicated and urgent than conventional approaches, mainly due to three aspects of the edge computing: highly distributed, limited and heterogeneous edge resources, the high cost of edge resources, and latency-critical and computation-intensive edge services.

As described above, the edge can achieve the lower service latency but with higher cost. In contrast, the cloud may incur a lower cost but with higher latency. Both services may struggle to meet the high latency requirement of services and low-cost resource provision simultaneously. Thus, the goal of the edge federation is trying to strike a balance between the latency and the cost, either the trade-off between the cloud and the edge. How to use the least cost to fulfill the service requirements and achieve the best QoS is the most critical problem in the edge federation.

Compared with cloud nodes, edge nodes are much more scattered in geography with a limited number of resources. Due to such the limitation, EIPs have to be careful when they provide the resource to services. This severely restricts their capacity in the size of the serving area and service demands Thus, the cooperation of different EIPs and the optimization of resource provision in the edge federation are more urgent than those in the cloud computing scenario. It may be challenging to maximize the resource provisioning efficiency in the highly distributed and limited edge resources.

The resources in edge nodes are limited. Further, many emerging services in the edge scenario have high computation and strict latency requirements (e.g., self-driving services, virtual reality, etc.) which require significant computation and storage resources. This dilemma makes the edge more likely to get into the "Spike" trouble (i.e., overload trouble) and suffer from resource shortages.

For these challenges, an efficient service provisioning method is needed. As described below, the architecture of the edge federation is designed, under which the corresponding service provisioning method can be developed.

The present disclosure relates to an edge federation system. In one embodiment, the edge federation system includes: an end device; an edge service provider (ESP) configured to contract services from the end device; an edge infrastructure provider (EIP) configured to provide edge computing resources to the contracted services from the ESP; a cloud server configured to provide service to the end device; and a consortium for managing resources between the EIP and the cloud server, wherein the consortium is further configured to calculate available resources of the EIP, calculate available resources of the cloud server, and optimize the distribution of services from the EIP and the cloud server to the end device.

In one embodiment, the consortium further includes a traffic analyzer; a central optimizer; and a dispatcher.

In one embodiment, the traffic analyzer is configured to analyze traffic patterns of service requests from the end device.

In one embodiment, the traffic patterns are used to characterize temporal service demands and spatial service demands.

In one embodiment, the central optimizer is configured to utilize the analyzed traffic patterns and utilize temporal-spatial information of the end device to compute a traffic redirection schedule.

In one embodiment, the dispatcher is configured to direct service requests from the end device to one or more of the ESP and the cloud server based on the traffic redirection schedule.

In one embodiment, the dispatcher utilizes routing mechanisms to direct service requests to a domain of the edge federation In one embodiment, the edge computing resources include an edge node.

In one embodiment, the central optimizer is configured to calculate the available resources of the edge node and is further configured to calculate the available resources of the cloud server.

In one embodiment, the central optimizer is configured to calculate the maintenance cost of the EIP.

In one embodiment, the central optimizer is configured to calculate a latency of the end device.

In one embodiment, the latency includes a computing latency and a content delivery latency.

In one embodiment, the content delivery latency includes an uploading delivery latency and a downloading delivery latency.

In one embodiment, the central optimizer is configured to generate a four-dimensional optimization problem based on a storage demand of the edge node, a computation demand of the edge node, a storage demand of the cloud server, and a computation demand of the cloud server.

In one embodiment, the central optimizer is configured to reduce the four-dimensional optimization problem into a two-dimensional optimization problem.

In one embodiment, the central optimizer further comprises a dynamic resolving algorithm configured to produce a service provisioning solution to the two-dimensional optimization problem using the available resources of the edge node, the available resources of the cloud server, the maintenance cost of the EIP, and the latency of the end device.

In one embodiment, a prediction methodology is used to estimate service demands of the end device.

In one embodiment, the prediction methodology is an auto regressive integrated moving average (ARIMA).

In one embodiment, the central optimizer utilizes the estimated service demands in producing the service provisioning solution.

Additionally, the present disclosure relates to a method for service provisioning in an edge federation. Steps for the method include: S100: modelling dynamic service demands, based on which a two-phase resource allocation process is formulated from vertical and horizontal dimensions; S200: obtaining latency constraints and utilizing the latency constraints to formulate a cost minimization problem of the edge federation, wherein the latency constraints comprise a computing latency and a content delivery latency, and the cost minimization problem is a four-dimensional optimization problem based on a storage demand of an edge node, a computation demand of the edge node, a storage demand of a cloud server, and the computation demand of the cloud server; S300: modelling the computing latency and content delivery latency, wherein the computing latency comprises the time consumption of completing a computation process of services and the content delivery latency comprises an uploading delivery latency and a downloading delivery latency; S400: using a delivery distance estimate the content delivery latency; S500: reformulating the cost minimization problem as a two-dimensional optimization problem and generating a service provisioning solution to the two-dimensional optimization problem using a dynamic resolving algorithm; and S600: providing dynamic service provisioning based on the service provisioning solution.

The present disclosure realizes the transparent service provisioning across independent EIPs and the cloud and improves the QoE of end users and save the cost of EIPs.

BRIEF DESCRIPTION OF THE DRAWINGS

The accompanying drawings illustrate one or more embodiments of the present disclosure and, together with the written description, serve to explain the principles of the present disclosure. Wherever possible, the same reference numbers are used throughout the drawings to refer to the same or like elements of an embodiment.

DETAILED DESCRIPTION

Figure 1:
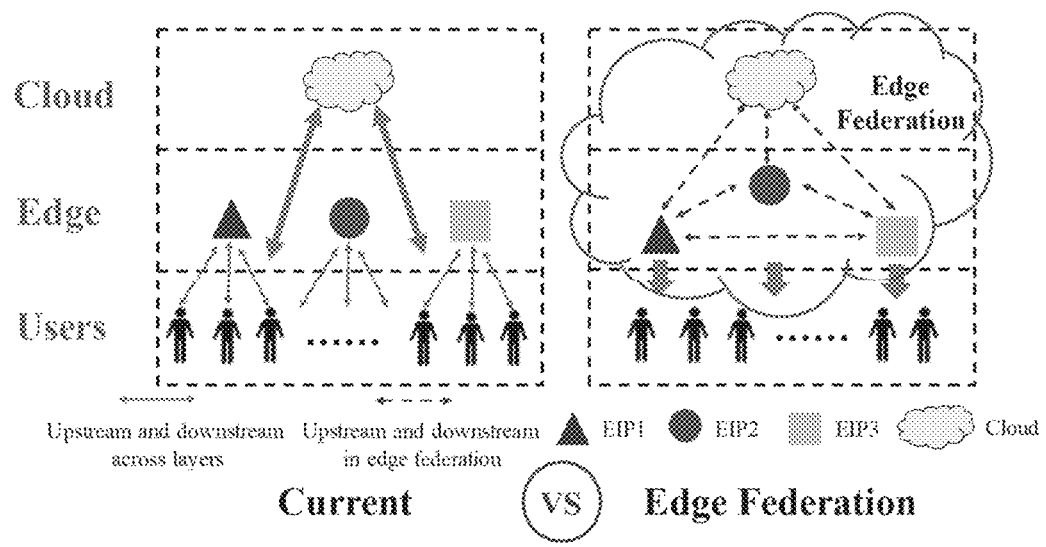
FIG. 1 is a schematic diagram of the comparison between the current edge computing paradigm and the edge federation, in accordance with an embodiment of the present disclosure.

The present disclosure will now be described more fully hereinafter with reference to the accompanying drawings, in which exemplary embodiments of the present disclosure are shown. The present disclosure may, however, be embodied in many different forms and should not be construed as limited to the embodiments set forth herein. Rather, these embodiments are provided so that this disclosure is thorough and complete, and will fully convey the scope of the present disclosure to those skilled in the art. Like reference numerals refer to like elements throughout.

Embodiments of the present disclosure are illustrated in detail hereinafter with reference to accompanying drawings. It should be understood that specific embodiments described herein are merely intended to explain the present disclosure, but not intended to limit the present disclosure.

In order to further elaborate the technical means adopted by the present disclosure and its effect, the technical scheme of the present disclosure is further illustrated in connection with the drawings and through specific mode of execution, but the present disclosure is not limited to the scope of the implementation examples.

The present disclosure relates to the field of edge computing, and more particularly relates to edge federation, resource integration, and an optimal service provisioning solution.

In one embodiment, referring to FIG. 1, the present disclosure provides an architecture of Edge Federation. The edge federation consortium can realize a transparent resource management mechanism over EIPs and cloud.

As shown on the left of FIG. 1, a conventional network environment mainly has three layers: the user layer consists of a large amount of heterogeneous end devices (e.g., mobile phones, vehicles, etc.), which dynamically request for high-performance services from ESPs; the edge layer is formed by EIPs, which are responsible for resource provisioning for ESPs. EIPs provide computation and storage resources, as well as techniques (e.g., NFV and SDN) and platforms (e.g., Amazon Web Services, Microsoft Azure, etc.); and the cloud layer provides similar types but a larger number of resources to end users.

In the current network environment, ESPs usually sign contracts and package the content of their services to EIPs.

An EIP typically manages its own resources and deliver the contracted services to corresponding end users.

Current service-provisioning models for individual EIP can be inefficient and costly. From the perspective of resources, EIPs independently deploy edge nodes at the edge of the network, where each edge node, including multiple edge servers, provides computation and storage resources for accommodating diverse services. The capacity and the serving range of an individual edge node may be much smaller than those of the cloud. Moreover, EIPs independently manage their resources without any cooperation in the current edge-computing model. Consequently, such a mechanism fails to achieve globally optimal scheduling of resources and services, hence leading to resource overloaded or under-utilization scenarios and typically results in a low QoS. From the perspective of cost, each EIP tends to build more edge nodes in new locations to increase the amount of resources and expand the service coverage. Multiple EIPs even build edge nodes in the same location for market competition. Such a method would cause a huge overhead (e.g., the expenditure of infrastructure construction, maintenance cost, energy cost, etc.) and severe resource waste. Eventually, such heavy resource burdens will be accommodated for by either EIPs, ESPs, or end users.

To overcome the aforementioned disadvantages, an edge federation is provided, including a transparent service-provisioning model in the multi-EIP environment. The edge federation involves two-dimension integration for service deployment, including integration between edge servers and the cloud, and seamless cooperation among heterogeneous edge nodes of multiple EIPs. The structure of the edge federation is shown on the right side of FIG. 1, including end devices, EIPs, ESPs, and cloud servers, wherein each EIP and cloud server is a member of edge federation, and the edge nodes and cloud nodes can share resources and interact with each other, without needing to be explicitly interconnected.

Figure 2:
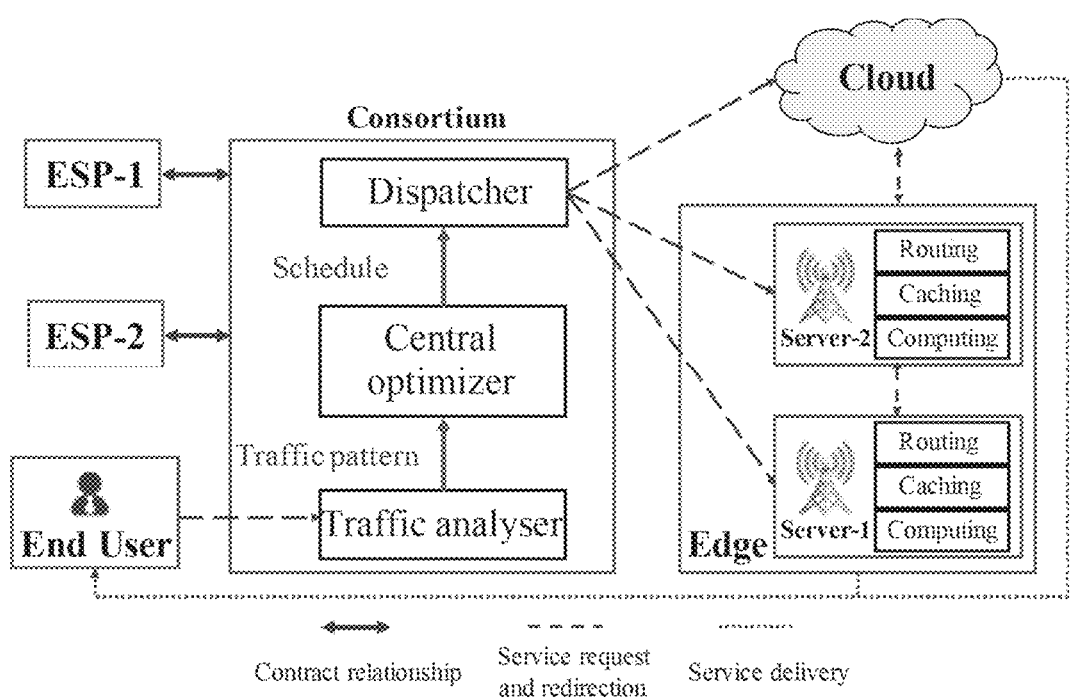
FIG. 2 is a schematic diagram of the architecture of an edge federation, in accordance with another embodiment of the present disclosure.

As shown in FIG. 2, the edge federation consortium includes three major components, including a traffic analyzer, a central optimizer, and a dispatcher.

The traffic analyzer is a module that continuously analyzes a traffic pattern based on various service requests from end users. The traffic patterns can accurately characterize the service demands temporally and spatially and will be served as an essential input to the central optimizer. Considering that many proposals are devoted to traffic prediction and modeling, existing methods' (e.g., ARIMA [11]) may be used in the traffic analyzer to predict the traffic.

The central optimizer is a major processing component of the edge federation consortium. It computes the traffic redirection schedule based on the obtained traffic pattern and the temporal-spatial information of end users (e.g., location, time, type of requesting service). Based on the schedule, EIPs deploy the corresponding requested services at the edge and cloud, and the dispatcher will redirect the service request accordingly.

Figure 3:
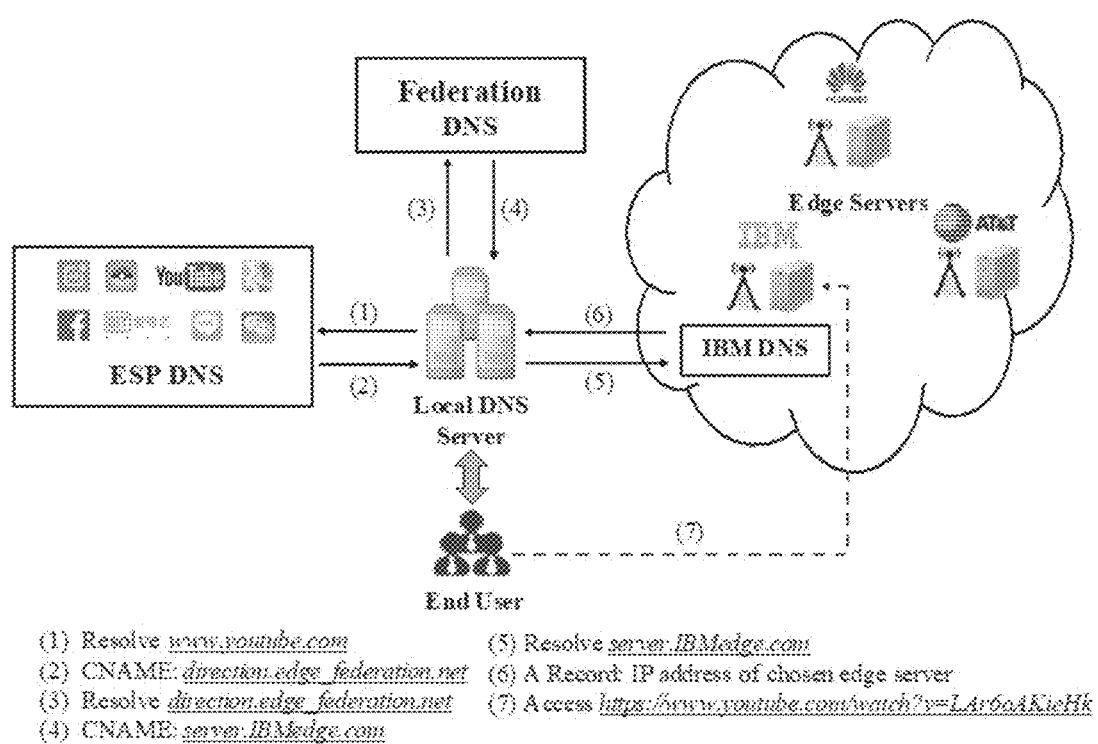
FIG. 3 is the schematic diagram of an exemplary request direction, in accordance with another embodiment of the present disclosure.
Figure 4A:
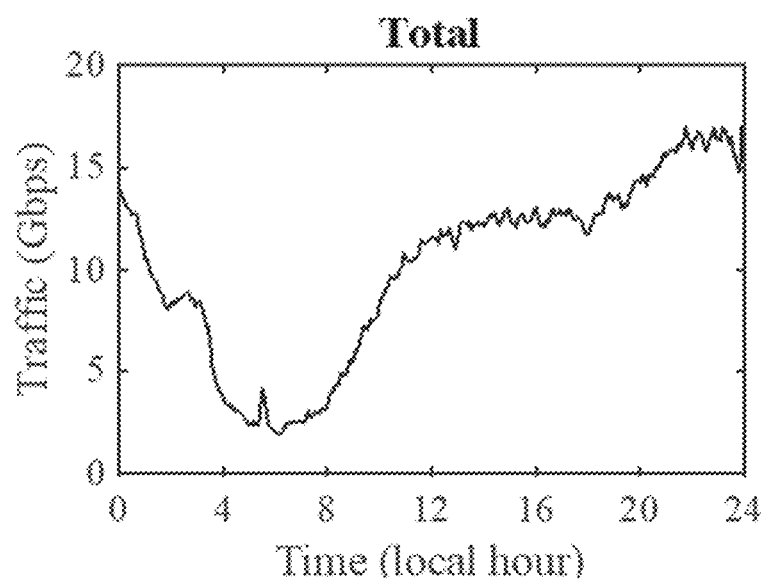
FIG. 4A is the graph of the traffic demands of total service at NORDUnet nodes, in accordance with another embodiment of the present disclosure.
Figure 4B:
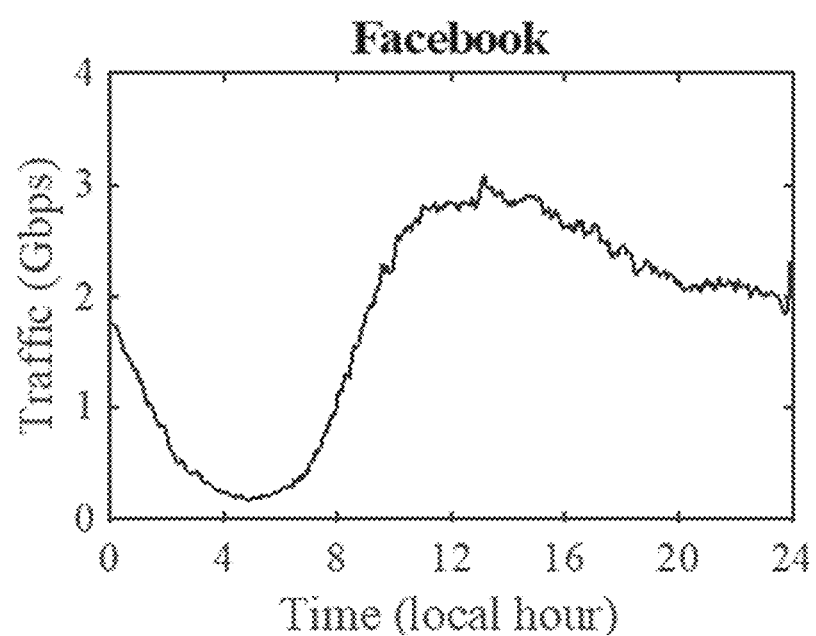
FIG. 4B is the graph of the traffic demands of Facebook service at NORDUnet nodes, in accordance with another embodiment of the present disclosure.
Figure 4C:
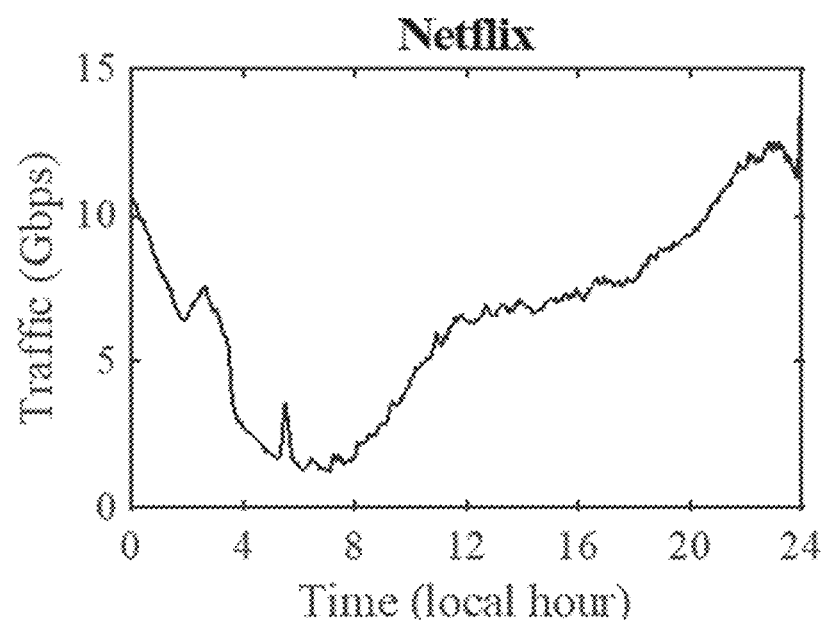
FIG. 4C is the graph of the traffic demands of Netflix service at NORDUnet nodes, in accordance with another embodiment of the present disclosure.
Figure 4D:
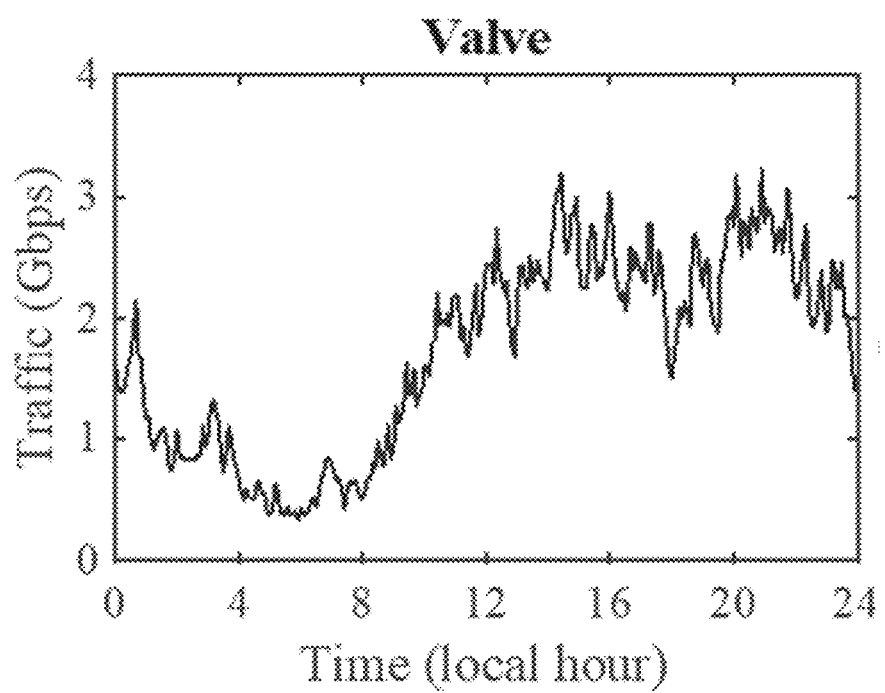
FIG. 4D is the graph of the traffic demands of Valve service at NORDUnet nodes, in accordance with another embodiment of the present disclosure.

The dispatcher redirects users' service requests to correct edge or cloud servers. Such redirection can be performed by existing routing mechanisms (e.g. DNS CNAME record, A record, etc.). A detailed example of service redirection based on the DNS technique is shown in FIG. 3. The end user at a specific area requests an online video. Unlike conventional mechanisms, the EIP DNS modifies its CNAME record to point to the domain of a federation DNS instead of the contracted EIP DNS domain. Then, based on the CNAME record from the redirection schedule, the consortium dispatcher makes the decision to redirect the user's request to the optimal edge server. Thus high-performance service can be achieved.

Traditionally, ESPs run services on the infrastructure of EIPs with a pay-as-you-go function. Different EIPs will manage their resources and deliver services to the end user independently. The difference between the money ESPs paid to EIPs, and the operation cost (e.g., storage cost, computation cost, communication cost, etc.) of EIPs is the revenue of the EIP. In the edge federation, ESPs will also run services on the EIP and pay the corresponding fee to the EIP. However, these services will be deployed by the edge federation with a global view of a unified resource pool, which consists of cloud nodes and edge nodes from different EIPs. Then, the node will deliver the corresponding service to the end user.

EIPs in the conventional model can only manage the corresponding service delivery on their edge nodes in limited areas. Compared with traditional methods, the edge federation makes it possible for EIPs to operate the service flexibly among a unified resource pool. Such methodology can help EIPs to deliver services to end users across shorter distances and using less infrastructure construction, allowing for a more cost-efficient service deployment and delivery with reasonable edge cooperation and cloud assist. As such, operation cost of EIPs can be reduced and revenue can be increased.

Traditionally, due to the limited coverage area of a single EIP, a corresponding contracted ESP can only spread its services to a considerably small region, resulting in a limited market size. Fortunately, due to the wide and densely distributed edge nodes of different EIPs in the unified resource pool, an individual ESP may cover a larger area. Moreover, with a similar unit price, ESPs will achieve a higher QoS.

The edge federation makes it possible for ESPs to run their services on any edge node of multiple EIPs. These edge nodes can be distributed in a variety of geographical locations. As a result, end users can potentially get the services from closer nodes with lower latency. Moreover, the reliability of service delivery can also be considerably enhanced.

Note that the edge federation is a trusted consortium, which is authorized to control the resources of EIPs. For existing infrastructures, the edge federation mainly aims to create a union between the infrastructures of different EIPs to improve service performance via optimized resource management and service deployment. For further business development and extension, the edge federation can be a joint-stock company, which shall undertake tasks of not only global resource management but also infrastructure construction. Thus, infrastructure can be a shared facility instead of belonging to a certain EIP and may be managed by the edge federation. As to the privacy issue raised by user data sharing among EIPs, previous work can be found related to solving privacy issues, e.g., private information retrieve [13] and data encryption [14]. In addition, previous works also demonstrated that data privacy can be guaranteed under the cloud computing and big data scenario, even if infrastructure providers may be unreliable [15].

In another embodiment, dynamic service demands are modeled, based on which a two-phase resource allocation process is formulated from vertically and horizontally. In order to guarantee service performance, latency constraints are obtained and used to formulate the cost minimization problem of the edge federation.

For an edge-computing network, there are various edge nodes, each of which may consist of multiple edge servers. It may be assumed that end users are geographically distributed according to the locations of edge nodes. Generally, there are four roles in the entire edge-computing network. Define U as the set of all end users, A as the set of cloud nodes, E as the set of edge nodes, and P as the set of edge services, respectively. Let u∈U represents a specific user, a∈A represents a specific cloud node, e∈E represents a specific edge node, while p∈P represents a specific edge service. For simplicity, It may be assumed that the topology of the designed edge federation is known in advance. The main notations are shown in Table. I.

TABLE I

MAIN NOTATIONS

| Notation | Description |
| --- | --- |
| T | A time period of n consecutive time slots. |
| U | Set of end users. |
| P | Set of ESPs. |
| A | Set of cloud nodes a. |
| E | Set of edge nodes e in EIPs. |
| $\alpha_{u,p}^{e}(t)$ | Fraction of storage demands of service p from end user u assigned to edge node e at time slot t. |
| $\beta_{u,p}^{e}(t)$ | Fraction of computation demands of service p from end user u assigned to edge node e at time slot t. |
| $\theta_{u,p}^{S,a(t)}$ | Fraction of storage demands of service p from end user u assigned to cloud a at time slot t. |
| $\theta_{u,p}^{C,a(t)}$ | Fraction of computation demands of service p from end user u assigned to cloud a at time slot t. |
| $S_{u,p}(t)$ | Amount of storage demands of service p from end user u at time slot t before computation. |
| $S'_{u,p}(t)$ | Amount of delivery contents of service p from end user u at time t after computation. |
| $C_{u,p}(t)$ | Amount of computation demands of service p from end user u at time slot t. |
| $S_a$ | Storage capacity of cloud node a. |
| $C_a$ | Computation capacity of cloud node a. |
| $S_e$ | Storage capacity of edge node e. |
| $C_e$ | Computation capacity of edge node e. |
| $S_E(t)$ | Total amount of storage demands deployed on edge at time slot t. |
| $C_E(t)$ | Total amount of computation demands deployed on edge at time slot t. |
| $l_{u,p}(t)$ | Service latency of service p for end user u at time slot t. |
| $h_u^a$ | Delivery distance between cloud server a and end user u. |
| $h_u^e$ | Delivery distance between edge server e and end user u. |
| $l_p$ | Latency requirement of service p. |
| $m_{u,p}(t)$ | Service satisfaction parameter indicates whether the service meets the latency requirement. |
| $l_p^{sat}$ | Satisfaction ratio of specific service p. |

The end users have time-varying service demands toward the storage and computations. The service demands within a time period T can be divided into n smaller equal time slots, e.g., 1 hour. Let the service demands p from end user u at time slot t be $K_{u,p}(t)=\{S'_{u,p}(t), S''_{u,p}(t), C_{u,p}(t)\}(\forall t \in T, t=1, 2, \ldots, n)$. Here, $S_{u,p}(t)$ and $S'_{u,p}(t)$ represent the amount of content before and after processing, respectively, while $C_{u,p}(t)$ denotes the computation demands of accomplishing the service.

These terms can be captured as follows:

$$\sum_{u \in U} S_{u,p}(t) = |U| \cdot q_p(t), \forall\, p \in P \quad (1)$$

$$S''_{u,p}(t) = S'_{u,p}(t) \cdot k_a, \forall\, u \in U, \forall\, p \in P, \forall\, t \in T \quad (2)$$

$$C_{u,p}(t) = S_{u,p}(t) \cdot k_c, \forall\, u \in U, \forall\, p \in P, \forall\, t \in T, \quad (3)$$

where |U| refers to the population of the target location area, $q_p(t)$ is the normalized traffic profile at time slot t whose value is related to a specified service p. $k_s$ is the coefficient profile that describes the size of the content after processing, and $k_c$ is the coefficient profile that describes the required computation resource for accomplishing the corresponding task. The traffic demands of the service p in the related area around edge server e at time t can be also captured by:

$$d_{e,p}(t) = |U|_e \cdot q_p(t), \forall p \in P \quad (4),$$

where $|U|_e$ represents the population of specified edge server location. As the service demands of users are highly dynamic, a tailored time slot is necessary for the cost-efficiency schedule of the edge federation. The implementation in later experiments shows that the time slot with a length of 1 hour is sufficient to yield the better result than the existing method. The determination of a suitable length of time is further described below.

Vertically, It may be assumed that each EIP will resolves part or all the storage demands $S_{u,p}(t)$ and computation demands $C_{u,p}(t)$ by cloud nodes. Two variables $\theta_{u,p}^{S,a}(t)$ and $\theta_{u,p}^{C,a}$ represent the fraction of storage and computation demands supplied by cloud node a at time slot t, respectively. The other $1-\Sigma_{a \in A}\theta_{u,p}^{S,1}(t)$ storage and $1-\Sigma_{a \in A}\theta_{u,p}^{C,a}(t)$ computation demands will be served by the edge nodes. The values of these fractions fall in the range of [0,1]:

$$0 \le \theta_{u,p}^{S,a}(t) \le 1, \forall u \in U, \forall p \in P, \forall t \in T \quad (5)$$

$$0 \le \theta_{u,p}^{C,a}(t) \le 1, \forall u \in U, \forall p \in P, \forall t \in T \quad (6).$$

At any time slot t, the storage and computation demand shall not exceed the capacity of the involved cloud nodes and edge nodes, resulting in the following two constraints:

$$\sum_{u \in U} \sum_{p \in P} S_{u,p}(t) \theta_{u,p}^{S,a}(t) \le S_a, \forall\, t \in T \quad (7)$$

$$\sum_{u \in U} \sum_{p \in P} C_{u,p}(t) \theta_{u,p}^{C,a}(t) \le C_a, \forall\, t \in T, \quad (8)$$

where $S_a$ and $C_a$ are the storage and computation capacity of a specific cloud node a. Given the dynamic demands from each location area of end users, it may be assumed that the least cloud capacities are able to satisfy the peak service demands, thus:

$$\sum_{a \in A} S_a = \max_{t \in T} \left\{ \sum_{u \in U, p \in P, a \in A} S_{u,p}(t) \theta_{u,p}^{S,a}(t) \right\} \quad (9)$$

$$\sum_{a \in A} C_a = \max_{t \in T} \left\{ \sum_{u \in U, p \in P, a \in A} C_{u,p}(t) \theta_{u,p}^{C,a}(t) \right\}. \quad (10)$$

Noting that the service demands of end users may change over time, the edge federation needs to manage hourly available resources. Compared to accessing an edge node, the latency of accessing a cloud node is higher, however, with lower resource cost. Therefore, to achieve a trade-off between the edge and cloud (i.e., cost and latency), It may be important to dynamically find the reasonable variables $\theta_{u,p}^{S,a}(t)$ and $\theta_{u,p}^{C,a}(t)$ by the management of the edge federation.

Horizontally, the amount of storage and computation demands supplied by edge nodes are:

$$S_E(t) = \sum_{u \in U} \sum_{p \in P} S_{u,p}(t)\left(1 - \sum_{a \in A} \theta_{u,p}^{S,a}(t)\right) \quad (11)$$

$$C_E(t) = \sum_{u \in U} \sum_{p \in P} C_{u,p}(t)\left(1 - \sum_{a \in A} \theta_{u,p}^{C,a}(t)\right). \quad (12)$$

Two variables $\alpha_{u,p}^e(t)$ and $\beta_{u,p}^e(t)$ are used to denote the fraction of storage demands $S_{u,p}(t)$ and computation demands $C_{u,p}(t)$ supplied by edge node e at time slot t, respectively, resulting in the following constraints:

$$0 \leq \alpha_{u,p}^e(t) \leq 1, \forall u \in U, \forall p \in P, \forall e \in E, \forall t \in T \quad (13)$$

$$0 \leq \beta_{u,p}^e(t) \leq 1, \forall u \in U, \forall p \in P, \forall e \in E, \forall t \in T \quad (14).$$

Then, the storage and computation capacity of the edge node e are defined as $S_e$ and $C_e$, respectively. They represent the maximum demands the edge node can serve in a single time slot, resulting in the following constraints:

$$\sum_{u \in U} \sum_{p \in P} S_{u,p}(t)\alpha_{u,p}^e(t) \leq S_e, \forall e \in E, \forall t \in T \quad (15)$$

$$\sum_{u \in U} \sum_{p \in P} C_{u,p}(t)\beta_{u,p}^e(t) \leq C_e, \forall e \in E, \forall t \in T. \quad (16)$$

Formulas (15) and (16) mean that the storage demand and computation demand that are assigned to the edge node e shall not exceed its capacity at any time slot. Ideally, those demands from all users shall be completely satisfied.

Thus, the following formulas are created:

$$\sum_{e \in E} \alpha_{u,p}^e(t) + \sum_{a \in A} \theta_{u,p}^{S,a}(t) = 1, \forall u \in U, \forall p \in P, \forall t \in T \quad (17)$$

$$\sum_{e \in E} \beta_{u,p}^e(t) + \sum_{a \in A} \theta_{u,p}^{C,a}(t) = 1, \forall u \in U, \forall p \in P, \forall t \in T. \quad (18)$$

To serve the demands of a set of users, the edge federation treats the minimization of the overall cost (i.e., maximization of revenue) of EIPs as an important optimization goal. Under an edge-computing scenario, the overall cost, V, can be divided into three parts, including the computation cost, the storage cost, and the communication cost.

For the cost of EIPs, it can be roughly divided into two categories: maintenance cost (the cost of servers, networking and power draw) and deployment cost (the cost of infrastructures) [16][17]. Maintenance cost varies temporally and can be possibly affected by many environmental factors in the edge computing scenario, such as the number of service demands and service requirements. The deployment cost, however, may be a one-time expenditure, which makes little difference once the infrastructure has deployed. Thus, maintenance cost is a main focus in long-term cost minimization problem. Moreover, the related power or energy cost will be properly "absorbed" in the components modeled in the service data storage, service computation, and service delivery process.

Therefore, during a time period T, the servers' cost on cloud nodes can be written as:

$$V^{cloud} = V_S^{cloud} + V_C^{cloud} + V_M^{cloud} \quad (19)$$

$$= \sum_{u \in U, p \in P, a \in A, t \in T} S_{u,p}(t)\theta_{u,p}^{S,a}(t)V_S +$$

$$\sum_{u \in U, p \in P, a \in A, t \in T} C_{u,p}(t)\theta_{u,p}^{C,a}(t)V_C +$$

$$\sum_{u \in U, p \in P, a \in A, t \in T} (S'_{u,p}(t) + S_{u,p}(t))\theta_{u,p}^{S,a}(t)V_M,$$

where $V_S^{cloud}$, $V_C^{cloud}$ and $V_M^{cloud}$ are the cost of storage, the cost of computation and the cost of communication in cloud nodes, respectively. $V_S$, $V_C$, and $V_M$ are the cost of per storage unit, the cost of per computation unit and the cost of per communication unit, respectively.

The servers' cost on edge nodes is:

$$V^{edge} = V_S^{edge} + V_C^{edge} + V_M^{edge} \quad (20)$$

$$= \sum_{u \in U, p \in P, e \in E, t \in T} S_{u,p}(t)\alpha_{u,p}^e(t)V_S^e +$$

$$\sum_{u \in U, p \in P, e \in E, t \in T} C_{u,p}(t)\beta_{u,p}^e(t)V_C^e +$$

$$\sum_{u \in U, p \in P, e \in E, t \in T} (S'_{u,p}(t) + S_{u,p}(t))\alpha_{u,p}^e(t)V_M^e,$$

where $V_S^{edge}$, $V_C^{edge}$, $V_M^{edge}$ are the Cost of Storage, the Cost of Computation and the cost of communication on edge nodes, respectively. $V_S^e$, $V_C^e$ and $V_M^e$ are the cost per storage unit, the cost per computation unit and the cost per communication unit of a specific edge node e, respectively.

Resource price is relatively stable in the current cloud computing market. Thus, all cloud nodes are assumed to have similar storage, computation and communication cost per unit. However, for edge computing, the resource market is still in an initial and unstable stage, and the resource price of an edge node resources in each EIP is quite different [6], [7]. Therefore, the edge nodes of different EIPs will have different storage, computation, and communication price in the edge federation model of the present disclosure.

As such, the total cost of all involved edge servers and cloud servers in an edge federation can be written as:

$$V = V^{cloud} + V^{edge} \quad (21).$$

The optimization goal is to minimize V over a certain time period. It is worth note that the final optimization result shall be subjected to the strict service latency requirements.

After introducing the service provisioning process, in another embodiment, the method for guaranteeing the service performance is presented in detail.

Latency is the key factor affecting service performance and can be roughly divided into two components, including computing latency and content delivery latency. Computing latency is the time consumption of completing the computation process of services. For an end user u, the computing latency of the service p on the cloud and edge servers can be respectively measured by:

$$l_{u,p}^{cloud,C}(t) = \sum_{a \in A} C_{u,p}(t)\theta_{u,p}^{C,a}(t)\frac{r_p}{C_a}, \forall u \in U, \forall p \in P, \forall t \in T \quad (22)$$

$$l_{u,p}^{edge,C}(t) = \sum_{e \in E} C_{u,p}(t)\beta_{u,p}^e(t)\frac{r_p}{c_e}, \forall u \in U, \forall p \in P, \forall t \in T, \quad (23)$$

where the parameter $r_p$ represents required the computation resource of service p by the end user u and is related to the service category (e.g., social networking, gaming, etc.). Note that, compared to larger computation resources provided by the cloud, the computation resources offered by the edge are limited. Thus, it can be concluded $C_a \gg C_e$ in general.

Delivery latency can be divided into uploading delivery latency and downloading delivery latency. Users usually access services through a one-hop transmission. Thus, delivery distance may be used instead of hop distance to estimate the delivery latency in this model. $h_u^a$ and $h_u^e$ are utilized to denote the delivery distance from cloud node a and edge node e to end user u, respectively. First, the service data shall be transferred from the user to the server. Uploading delivery latency in the cloud and the edge at time slot t can be estimated as follows, respectively:

$$l_{u,p}^{cloud,up}(t) = \sum_{a \in A} S_{u,p}(t)\theta_{u,p}^{S,a}(t)h_u^a, \forall u \in U, \forall p \in P, \forall t \in T \quad (24)$$

$$l_{u,p}^{edge,up}(t) = \sum_{e \in E} S_{u,p}(t)\alpha_{u,p}^e(t)h_u^e, \forall u \in U, \forall p \in P, \forall t \in T. \quad (25)$$

Subsequently, after processing in the server, the processed service data will be returned to the users. Thus, the downloading delivery latency in the cloud and the edge at time slot t can be described as:

$$l_{u,p}^{cloud,do}(t) = \sum_{a \in A} S'_{u,p}(t)\theta_{u,p}^{S,a}(t)h_u^a, \forall u \in U, \forall p \in P, \forall t \in T \quad (26)$$

$$l_{u,p}^{edge,do}(t) = \sum_{e \in E} S'_{u,p}(t)\alpha_{u,p}^e(t)h_u^e, \forall u \in U, \forall p \in P, \forall t \in T. \quad (27)$$

The service demands of services usually vary temporally and spatially for heterogeneous end users. Hence, the required performance of services (e.g., latency requirement) can be guaranteed by the schedule of the edge federation. Let $l_p$ denote the required latency of accessing service p. In any time slot t, only when the actual latency does not exceed $l_p$, the service can be regarded as satisfied in that time slot. Therefore, the relationship between the actual latency and required latency can be defined as:

$$l_{u,p}(t) = l_{u,p}^{cloud}(t) + l_{u,p}^{edge}(t) = [l_{u,p}^{could,S}(t) + l_{u,p}^{cloud,C}(t)] + [l_{u,p}^{edge,S}(t) + l_{u,p}^{edge,C}(t)]l_p \quad (28),$$

where $l_{u,p}(t)$ denotes the actual latency of service p from end user u at time slot t. A satisfaction parameter $m_{u,p}(t)$ may be used to represent whether a service demand of the user u is guaranteed, which can be defined as:

$$m_{u,p}(t) = \begin{cases} 1, & l_{u,p}(t) \leq l_p \\ 0, & l_{u,p}(t) > l_p \end{cases}. \quad (29)$$

Moreover, edge federation needs to keep the corresponding services at a high-level performance in the business environment to attract more users and improve revenues.

The overall performance of service p in edge federation can be measured by the satisfaction ratio $r_p^{sat}$, which can be written as:

$$r_p^{sat} = \frac{\sum_{t \in T}\sum_{u \in U} S_{u,p}(t)m_{u,p}(t)}{\sum_{t \in T}\sum_{u \in U} S_{u,p}(t)}. \quad (30)$$

According to the existing industry standards, the satisfaction ratio can reach following range:

$$l_1 \leq r_p^{sat} \leq l_2 \quad (31)$$

where $l_2$ can be 100%, and $l_1$ is usually larger than 99%.

The satisfaction ratio of service p is evaluated by the satisfied service demands of each user in every time slot. Thus, those service demands are accumulated, whose latency requirements have been satisfied, to calculate the satisfaction ratio of a specific service. Note that calculating the service satisfaction with a global measure is inaccurate, such as the average service latency, due to potential uneven distribution (e.g., a bimodal distribution) of service latency for each user.

Therefore, under the latency constraints, the problem that the central optimizer needs to solve for the edge federation can be formulated as the following optimization problem (32):

$$\begin{cases} \min_{\{\theta_{u,p}^{S,a}(t), \theta_{u,p}^{C,a}(t), \alpha_{u,p}^e(t), \beta_{u,p}^e(t)\}} V & (32a) \\ \text{s.t. } 5 \sim 8, 13 \sim 18, 31 & (32b) \end{cases}$$

By solving this optimization problem, the optimal resource assignment schedules (e.g. optimal caching and computing variables) of edge federation at every time slot can be found. Thus, edge federation can achieve following superiorities:

Scalability: although the edge resources of EIPs are limited, the cloud resource can be the important supplement (vertical integration) and enable EIPs to easily serve the service demands with elastic resource configuration. For instance, if there are huge-amount service demands beyond the capacity of edge resources, edge federation can improve $\theta_{u,p}^{S,a}(t)$ and $\theta_{u,p}^{C,a}(t)$ to utilize more cloud resources. Then, as shown in (17) and (18), the $\alpha_{u,p}^e(t)$ and $\beta_{u,p}^e(t)$ will be reduced. With such an adjustment, EIPs can enhance their resource capacities and push services with low latency requirements to the cloud and thus leave more edge resources for the coming services with high latency requirements.

Efficiency: as pointed in expression (28) to (31), the service latency requirements can be guaranteed in the service provisioning process. Therefore, with the latency constraints, the central optimizer of the edge federation gives the optimal service provisioning schedule to minimize the cost of EIPs. Note that, with the target of minimizing the cost of EIPs, the service latency is not necessarily as low as possible. Rather to control latency (i.e., the variables $\theta_{u,p}^{S,a}(t)$, $\theta_{u,p}^{C,a}(t)$, $\alpha_{u,p}^e(t)$ and $\beta_{u,p}^e(t)$) may be adjusted to satisfy requirements, and then EIPs can use relatively inexpensive cloud resources more liberally to avoid high overhead associated with edge servers. Therefore, edge federation may achieve efficient and qualified service delivery under different service requirements.

Low Latency: due to horizontal resource integration, the edge federation can have more edge nodes to deploy service in a wider geographical area. The edge federation is able to place services closer (e.g., a smaller $h_u^e$ in formulas (25) and (27)) to the end user by adjusting the edge resource variables (i.e., $\alpha_{u,p}^e(t)$ and $\beta_{u,p}^e(t)$. Although in the present disclosure, a main focus is on the cost minimization problem instead of minimizing service latency, the above operation can possibly make better use of the edge resources and enable the lower service latency (i.e., the smaller accumulated delivery distance $\Sigma_{e \in E} h_u^e$ in formulas (25) and (27)).

In the problem of the present disclosure, variables $\theta_{u,p}^{S,a}(t)$, $\theta_{u,p}^{C,a}(t)$, $\alpha_{u,p}^e(t)$ and $\beta_{u,p}^e(t)$ are related to four factors including the edge nodes/cloud nodes, end users, services and time slots. Hence, when the optimization problem of each time slot is formulated, it may be found that the variable matrix is a four-dimensional matrix, which may be difficult to solve and can be time-consuming. Therefore, the problem may be reformulated as a low-dimension optimization problem so that it can be efficiently and inexpensively solved. Particularly, the four-dimensional matrices may be transformed into two-dimensional matrices.

$V_S^{edge}$, part of V, for example, may be used to illustrate the transformation process. In a simple scenario, only one service and a single time slot (i.e., $|P|=1$, $|T|=1$) are considered. As such, the original four-dimension caching variables can be converted to two-dimension variables, e.g., $\alpha_{u,p}^e(t)$ can be converted to $\alpha_u^e$, where $u \in U$, $e \in E$. Assume that $|U|=i, |E|=j$, the variable matrix of $\alpha_u^e$ can be written as:

$$\alpha := \begin{bmatrix} \alpha_1^1 & \cdots & \alpha_1^j \\ \vdots & \ddots & \vdots \\ \alpha_i^1 & \cdots & \alpha_i^j \end{bmatrix} \quad (33)$$

where each $\alpha_i^j$ means the fraction of storage demands requested by user u and assigned to edge node e. Let the vector $S=(S_1, S_2, \ldots S_i)^T$ denote the amount of storage demands from each end user. The vector $V_S^E = (V_S^{e1}, V_S^{e2}, \ldots, V_S^{ej})$ represent the cost of per storage unit in different edge nodes. Therefore, the $V_S^{edge}$ part can be formulated as:

$$V_S^{edge} = \|(SV_S^E) \cdot \alpha\|_1 \quad (34)$$

where the symbol "$\circ$" denotes the Hadamard product of two matrices, and each element of the matrix $(SV_S^E) \cdot \alpha$ represents the cost at a certain edge node.

The solution for a more general case that includes multiple services and multiple time slots (i.e., $|P|=m$ and $|T|=n$) was described above. In this case, the matrix of variable $\alpha_{u,p}^e(t)$ can be converted into a super matrix that consists of $m*n$ aforementioned two-dimension matrices (refer to (33)). Thus, the variable $\alpha_{u,p}^e(t)$ can be extended as following:

$$\hat{\alpha} := [\alpha(1), \alpha(2), \ldots, \alpha(m*n)] \quad (35)$$

where each matrix $\alpha(l)$ represents the matrix of storage variable $\alpha_u^e$ of a certain service $\hat{p}$ at time slot t, and $m*(t-1)+\hat{p}=l$.

The vector S and $V_S^E$ can also be extended for the general case as follows:

$$\hat{S} := [S(1), S(2), \ldots, S(m*n)]^T \quad (36)$$

$$\hat{V}_S^E := [V_S^E(1), V_S^E(2), \ldots, V_S^E(m*n)] \quad (37)$$

In which each $S(l)$ and $V_S^E(l)$ represent the storage demand vector and the edge caching cost vector of service $\hat{p}$ at time slot t, respectively. Thus, $m*(t-1)+\hat{p}=l$.

$V_S^{edge}$ can be converted to:

$$V_S^{edge} = \|(\hat{S}\hat{V}_S^E) \cdot \hat{\alpha}\|_1 \quad (38).$$

In this way, the variable matrices of variables $\theta_{u,p}^{S,a}(t)$, $\theta_{u,p}^{C,a}(t)$, $\alpha_{u,p}^e(t)$ and $\beta_{u,p}^e(t)$ may be reduced to two dimensions and without any approximation. Thus, there is no loss with the transformation, and the optimization result is still optimal. Finally, the problem (32) can be solved efficiently with existing LP solvers such as CVX Gurobi solver [18].

After the transformation mentioned above, a dynamic resolving algorithm, named SEE (Service provision for edge federation), may be used to achieve an efficient service provisioning solution in the edge federation environment.

Specifically, as shown in the following Algorithm 1, the methodology of the present embodiment is developed under dynamic service demands; thus service provisioning shall be rescheduled at each time slot. Storage and computation capacities of cloud nodes and edge nodes ($C_a$, $S_a$, $C_e$ and $S_e$), the profile of services' computation and latency requirements (i.e., $r_p$ and $l_p$), and the transmission distance ($h_e$ and $h_a$) may be used as inputs of the aforementioned algorithm. In each time slot, the demands of services may be predicted using a well-studied method (e.g., ARIMA). Based on the prediction results, the edge federation can solve the optimization problem (32) and calculate the schedule for the next time slot in advance. Such an optimization process is mainly executed by the consortium of edge federation for enabling dynamic optimal service provisioning. The consortium decides how much workload retain at the edge or offload to the cloud, and how to deploy services among heterogeneous edge servers and cloud servers.

---

Algorithm 1 SEE algorithm
Input: $C_a$, $S_a$, $C_e$, $S_e$, $r_p$, $l_p$, $h_e$, $h_a$
Output: edge storage variable $a_{u,p}^e(t)$, edge computation variable $\beta_{u,p}^e(t)$, cloud storage variable $\theta_{u,p}^{S,a}(t)$, and cloud computation variable $\theta_{u,p}^{C,a}(t)$;
1: for $t_1$ to $t_n$
2:   Predict the service demands of different services $K_{u,p}(t) = (S_{u,p}(t_i), S'_{u,p}(t_i), C_{u,p}(t_i))$
3:   Update the $a_{u,p}^e(t_i), \beta_{u,p}^e(t_i), \theta_{u,p}^{S,a}(t_i), \theta_{u,p}^{C,a}(t_i)$ by solving the optimization problem (32a)
4:   Calculate the cost of EIPs at time slot $t_i$: $V(t_i) = (V^{edge}(t_i) + V^{cloud}(t_i))$
5: end for

---

In another embodiment, datasets of the edge-computing environment from the published data of the Canadian government are obtained [19], which provide the details of the location and company of base stations all over Canada. The base station dataset may be used as follows:

i) upgrading base stations to edge nodes is a reasonable and accessible solution for the construction of future edge-computing environment;

ii) the datasets have specific location information of base stations. Hence, because a round trip time between two nodes is approximately linear with their geo-distance [20], the content delivery latency can be accurately estimated.

Figure 5:
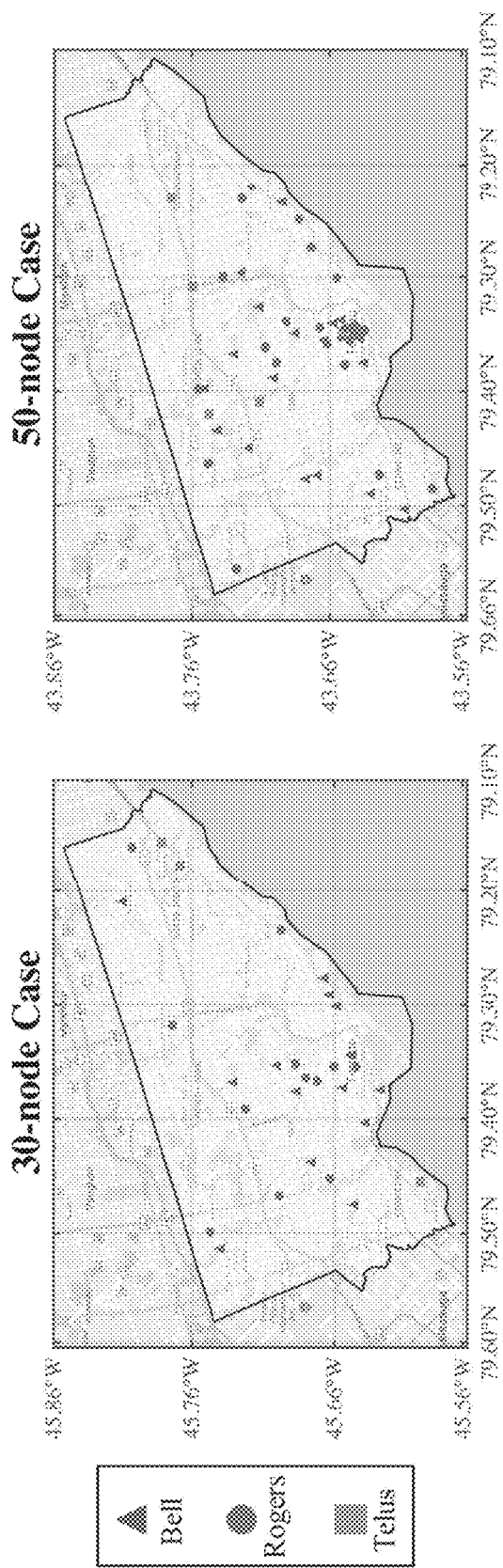
FIG. 5 is a base station map of Toronto city, in accordance with another embodiment of the present disclosure.

The designed network of the present experiments is constructed across the region of the Toronto city. As shown in FIGS. 5, 30 and 50 base stations are selected as potential edge nodes by fully considered the density of the population and the business condition in different areas of the city. Compared with a non-flourishing area, a larger number of edge nodes are needed in a prosperous and populous area. All of the base stations are chosen from three popular telecommunication providers in Canada, including Bells, Rogers, and Telus. The Amazon Datacenter in Montreal and the Google datacenters in the United States are selected as potential cloud nodes in the experiments of the present disclosure. Therefore, these selected edge nodes and cloud nodes make up the designed network in the present disclosure.

Subsequently, service traffic data from the NORDUnet, a research and education-oriented network infrastructure that hosts caching servers at various peering points over Europe and North America, is collected. By using real-world trace data, synthetic service demands of end users at each location in the designed network of the present disclosure are generated.

Three types of services may be the main focus of the present disclosure, including online gaming, online video, and social media. The services represent the high, normal, and low latency requirements, respectively. Thus, three representative services are selected, including Valve, Netflix, and Facebook. FIGS. 4A, 4B, 4C, and 4D show the traffic curves in a 24-hour time window. As shown, Netflix accounts utilize a major portion of the traffic. The peak demands of Valve and Netflix appear at night, while the peak demands of Facebook appear in the daytime.

Referring to the above service demand patterns, synthetic traffic demands for the evaluation are generated. First, the traffic demand of each service as the traffic profile are normalized, i.e., $q_p(t)$, $\forall t \in T$. Next, the amount and density of the population of Toronto are collected from online published data [22] [23]. Based on the acquired data, synthetic service demands may be generated for the location area of each end user by calculating (1)-(3) of different types of services. This traffic information is treated as the result of the Traffic Analyzer in FIG. 2 and sent to the Central Optimizer for calculating the optimal service provisioning and requesting schedules.

As shown below, the service provisioning process of Telus, Rogers, and Bell are analyzed in both the 30-node case and 50-node case. Two service provisioning models are used to compare to the edge federation. In a fixed contract model, each ESP can only contract with one EIP. To test the performance of the fixed contract model, several fixed relationships are assumed: Telus contracts with Facebook, Rogers contracts with Valve, and Bell contracts with Netflix. For multihoming, one ESP can contract with several EIPs, where each EIP manages its resource independently without the global view. It may be assumed that Telus contracts with Facebook and Valve, Rogers contracts with Valve and Netflix and Bell contracts with Netflix and Facebook. Moreover, to achieve fairness, the computation and storage capacity of edge and cloud nodes are set to be the same in different models.

The performance of existing service provisioning models and the edge federation model may be analyzed by the cost of EIPs, under different latency requirements of services and the varying amount of service demands. Particularly, not only the total cost but also the average cost may be considered, which can be defined as follows:

The total cost may be the overall cost in total 24 time slots for all EIPs, which can be calculated by (21).

The average cost may be the average cost of each EIP for end users at each location at time slot t can be defined as:

$$v_{u,p}(t) = \left[\sum_{u \in U}\sum_{e \in E} S_{u,p}(t)\alpha^e_{u,p}(t)V^e_S + \sum_{u \in U}\sum_{e \in E} S_{u,p}(t)\beta^e_{u,p}(t)V^e_C\right]/n_{users},$$

where $n_{users}$ represents the number of users.

Figure 6A:
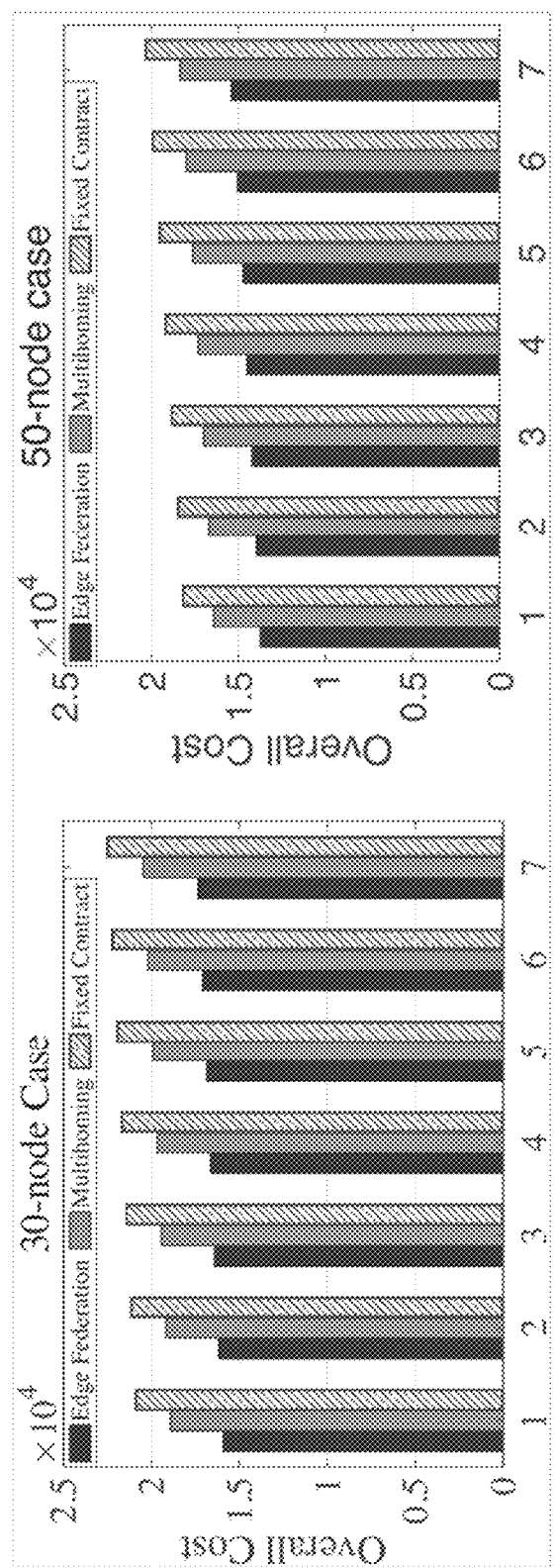
FIG. 6A is a graph of the overall cost of 50-node and 30-node cases with various latency requirements, in accordance with another embodiment of the present disclosure.
Figure 6B:
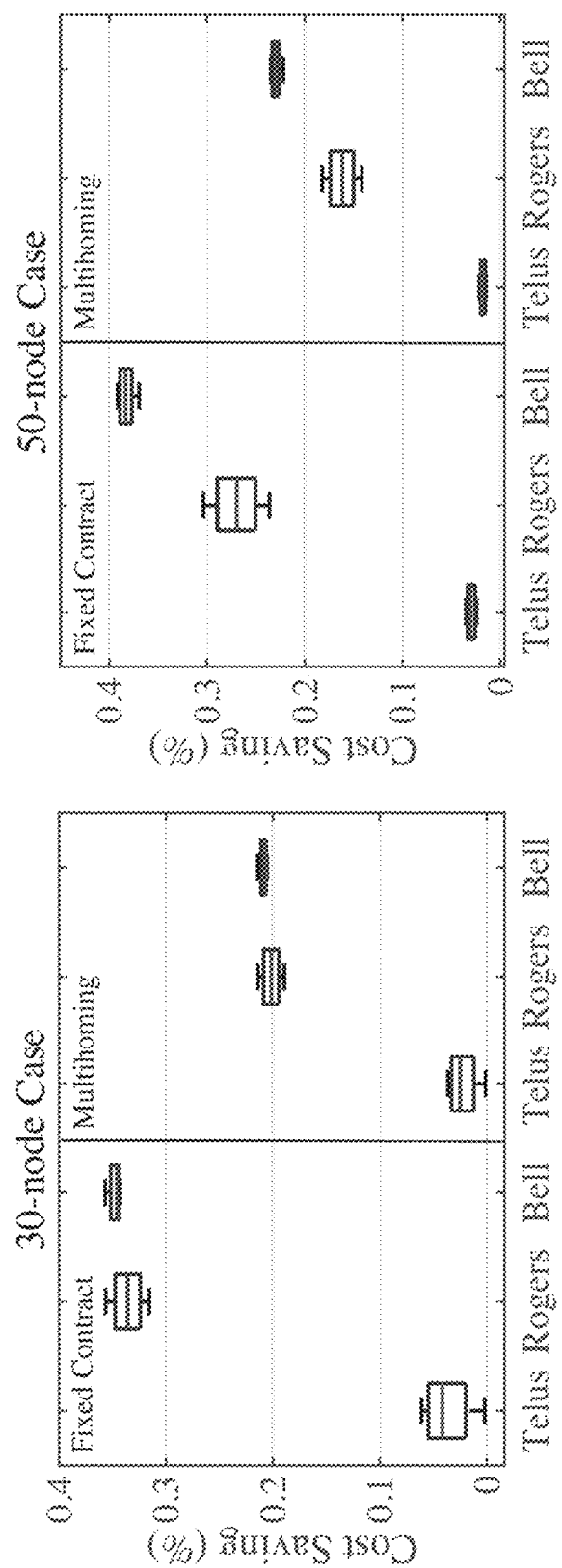
FIG. 6B is a graph of the range of cost savings for each EIP, in accordance with another embodiment of the present disclosure.

FIGS. 6A and 6B present the overall cost of the 50-node and 30-node cases with various latency requirements. Detailed requirements are shown in Table. II, where a smaller number represents more strict requirements. First, it may be observed that, with the requirements from loose to strict, the overall cost increases, which may be consistent with expectations that the edge resource is used to provide low service latency, and higher requirements of latency will incur more usage of edge resources (than that of the cloud). Because the edge resource has a higher cost per unit than the cloud resource, the overall cost increases. Moreover compared with other models, the edge federation can be more cost-efficient for EIPs and achieve better service provisioning performance. For instance, compared with the multi-homing model and fixed contract model, edge federation can achieve an average of 15.5% and 23.3% savings in 30-node case, and an average of 16.3% and 24.5% savings in 50-node case, respectively. The saving will be significant for EIPs, especially for those with many edge nodes in the extensive coverage area. It shall also be noted that in each latency requirement group, the total cost of the 50-node case is lower than the cost in the 30-node case. As such, compared with the 30-node case, the 50-node case has a greater number and more efficient (i.e., shorter distance to the end user) options in a specific area for the EIPs' deployment. Thus, EIPs can avoid remote service deployment, and the cost of service delivery can be saved.

To determine whether or not the type of service has a significant impact on cost saving, the performance of each EIP may be individually analyzed under the constraints of varying latency requirements from latency requirement groups 1 to 7 in Table.II. The corresponding results are shown in FIGS. 6C and 6D, where the range of cost savings for each EIP is given. As shown, compared with the fixed contract model, Telus, Rogers, and Bell save about 3.7% and 3.0%, 33.6% and 26.0%, 34.8% and 38.1% of the costs in 30-node and 50-node cases, respectively; compared with the multihoming model, Telus, Rogers, and Bell save about 2.5% and 1.5%, 20.1% and 16.1%, 20.6% and 22.2% of the costs in 30-node and 50-node cases, respectively. Such results indicate that the edge federation is advantageous for all kinds of EIPs, irrespective of the services they contracted and the number of nodes the EIPs have.

TABLE II

| LATENCY REQUIREMENTS FOR THREE SERVICES | | | | | | | |
|---|---|---|---|---|---|---|---|
| | 1 | 2 | 3 | 4 | 5 | 6 | 7 |
| Facebook | 72 | 68 | 64 | 60 | 56 | 52 | 48 |
| Valve | 36 | 34 | 32 | 30 | 28 | 26 | 24 |
| Netflix | 54 | 51 | 48 | 45 | 42 | 39 | 36 |

In addition, it may be found that the EIP contracted with the higher latency requirement service will receive even greater cost saving. This may be because higher latency requirement services need to use more edge resources. However, the limited-capacity and low-coverage edge resources in an individual EIP make it difficult for EIPs deploying and provisioning services in an efficient way. For example, without limitation, due to the considerable accumulated distance between different edge nodes, the service provisioning process will cause significant service delivery cost. Such a dilemma can be significantly alleviated by resource integration in the edge federation, and thus the cost of service delivery can be reduced, especially for the high latency requirement services.

As shown above, the total cost over the whole period is examined without considering the cost variation of each time slot. As will be described below, given the fixed latency constraints of the services (i.e., group six in Table.II), cost variation under dynamic service demands (i.e., from the time dimension) is considered. The average cost of Rogers, Bell and Telus over the whole time period is shown in FIGS. 7B, 7C and 7D, respectively, and have two major observations. First, combined with FIGS. 4A, 4B, 4C, and 4D (i.e., the inset plot in FIGS. 7B, 7C and 7D), it can be shown that the average cost curve of edge federation oscillates as time varies and has similar changing trend with the amount of the service demand, e.g., the peak of the average cost curve is consistent with that of the service demand curve. Second, regardless of the service demand variations, the edge federation model typically outperforms the other two models in both 30-node and 50-node cases, with 11.8% and 17.6% cost savings for Rogers, 15.1% and 22.6% for Bell, and 1.3% and 1.8% for Telus, respectively.

Figure 7A:
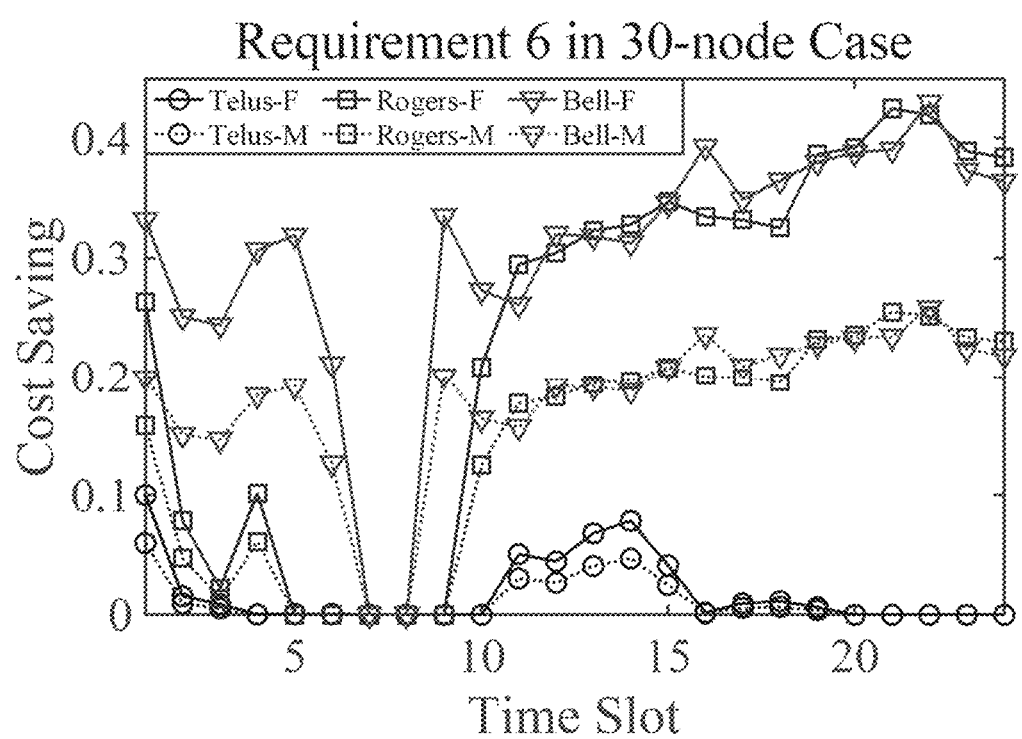
FIG. 7A is a graph of the cost saving of three EIPs under the latency requirement 6 in 30-node case, in accordance with another embodiment of the present disclosure.
Figure 7B:
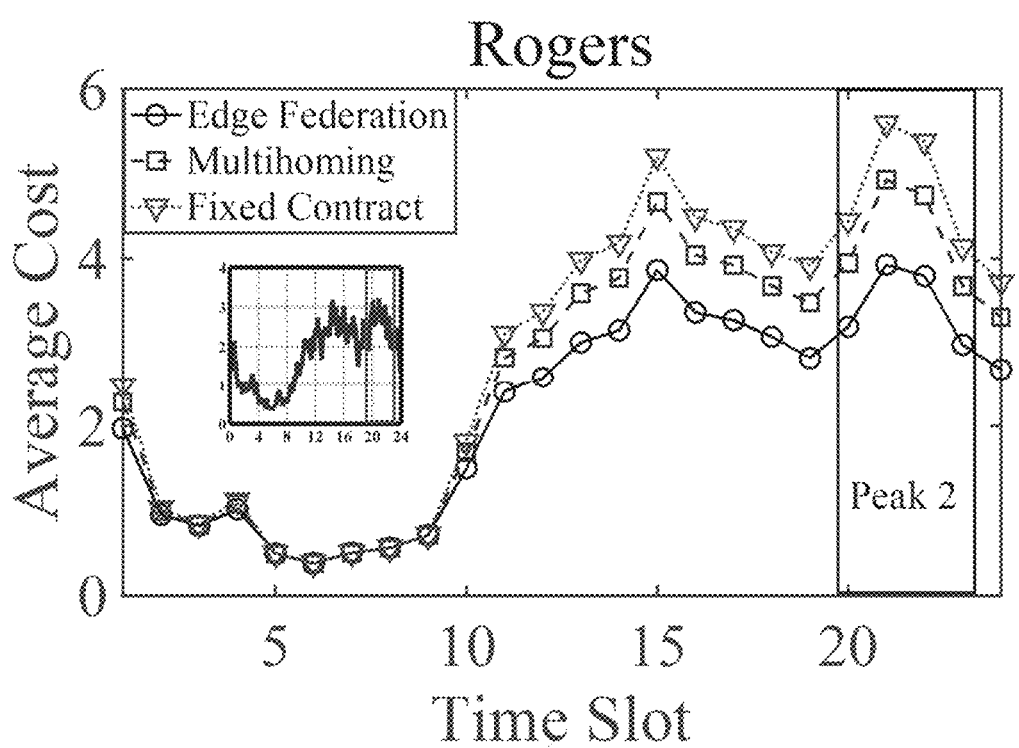
FIG. 7B is a graph of the average cost of Rogers over the whole time period in another embodiment of the disclosure.
Figure 7C:
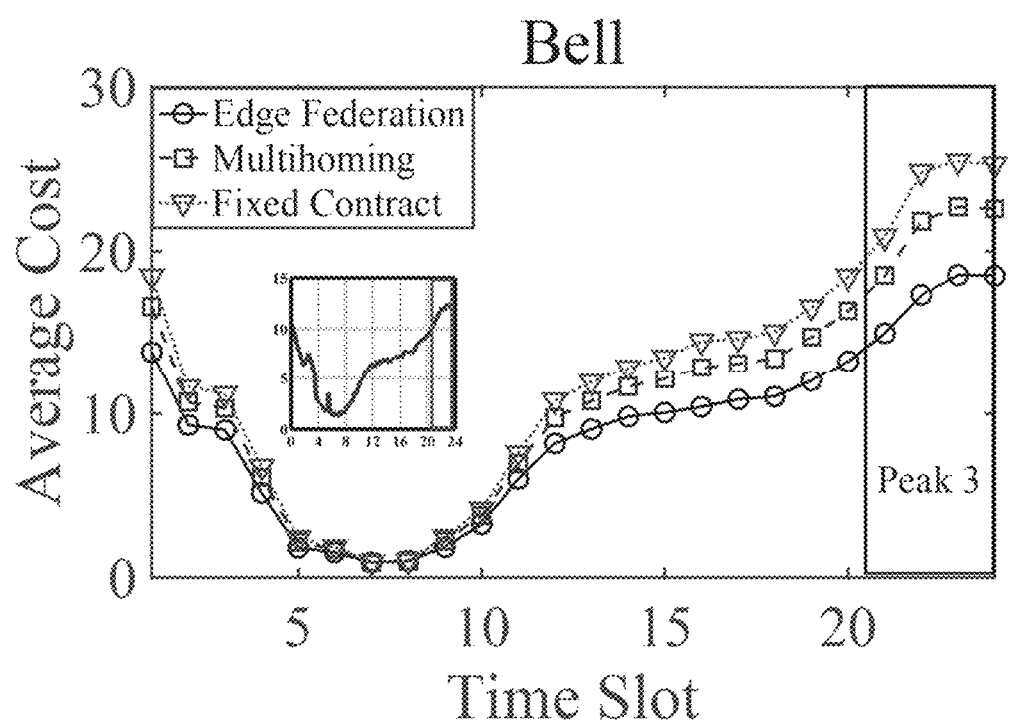
FIG. 7C is a graph of the average cost of Bell over the whole time period, in accordance with another embodiment of the present disclosure.
Figure 7D:
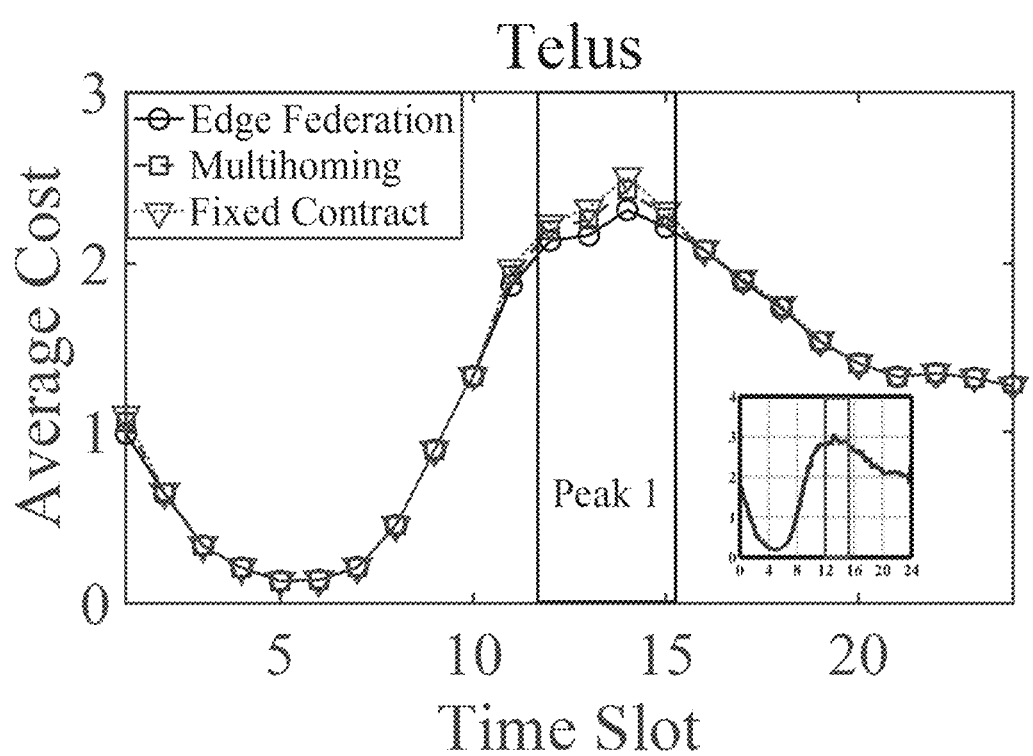
FIG. 7D is a graph of the average cost of Telus over the whole time period, in accordance with another embodiment of the present disclosure.

FIGS. 7A, 7B, 7C, and 7D show the Service provisioning cost of three EIPs, under fixed contract, multihoming and edge federation models in a 30-node case. FIG. 7A shows the cost saving of three EIPs under the latency requirement 6 in the 30-node case. FIGS. 7A, 7F and 7M represent the fixed contract and multihoming model, respectively.

Combined with FIGS. 4A, 4B, 4C, and 4D, there is a similar changing trend between the amount of service demands and cost savings, and the higher cost saving is likely to occur when service demand is larger, which demonstrates that cost saving has a strong correlation with the amount of service demands. For instance, a 4-time-slot window is used to circle the peak cost of each service in FIGS. 7A, 7B, 7C and 7D. Peak 1 (time slot 12 to 15), Peak 2 (time slot 20 to 23) and Peak 3 (time slot 21 to 24) represent the peak costs of Telus, Rogers and Bell, respectively. It is clear that the time windows of peak cost saving are matched with the peak service demands in each service, showing that the edge federation achieves even better performance in the case of the larger amount of service demands. It can be significantly helpful in the practical huge-traffic network environment.

Figure 8A:
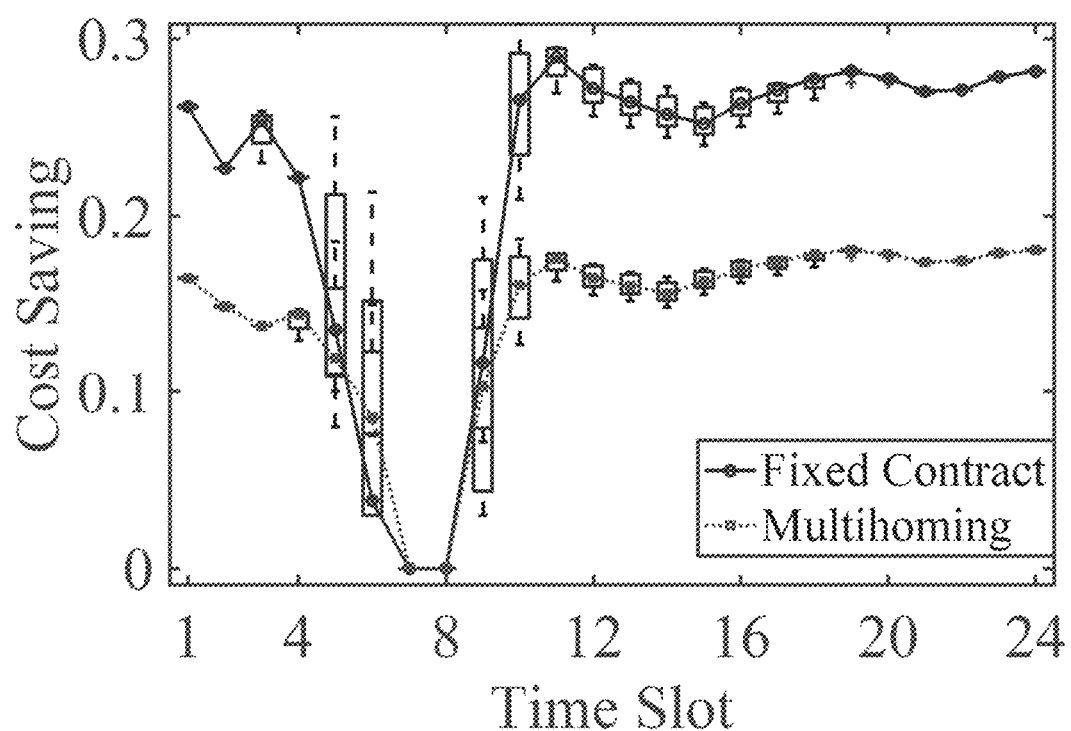
FIG. 8A is a graph of the performance from both the time dimension and the latency requirement dimension in 30-node case, in accordance with another embodiment of the present disclosure.

As shown in FIG. 8A, the performance from both the time dimension and the latency requirement dimension are analyzed in the 30-node case. From the time dimension, compared with the fixed contract model and multihoming model, it can be observed that the cost savings tend to be positive, which means edge federation outperforms other models regardless of how many service demands are required. From the dimension of varying requirements, the edge federation shows steady cost savings with minor fluctuations over different latency requirements. Cost saving has relatively large fluctuations from time slot 5 to time slot 10, whereas the performance oscillates within a small range in the other time.

To figure out the underlying rationale, the daily traffic may be examined in FIGS. 4A, 4B, 4C, and 4D, and it may be found that the traffic from the time slot 5 to the time slot 10 is much lower than the other time slots. This indicates that edge federation can achieve more stable performance in a massive traffic scenario than in a light traffic scenario. This result once again proves that edge federation may be suitable for the real huge-traffic environment.

Figure 8B:
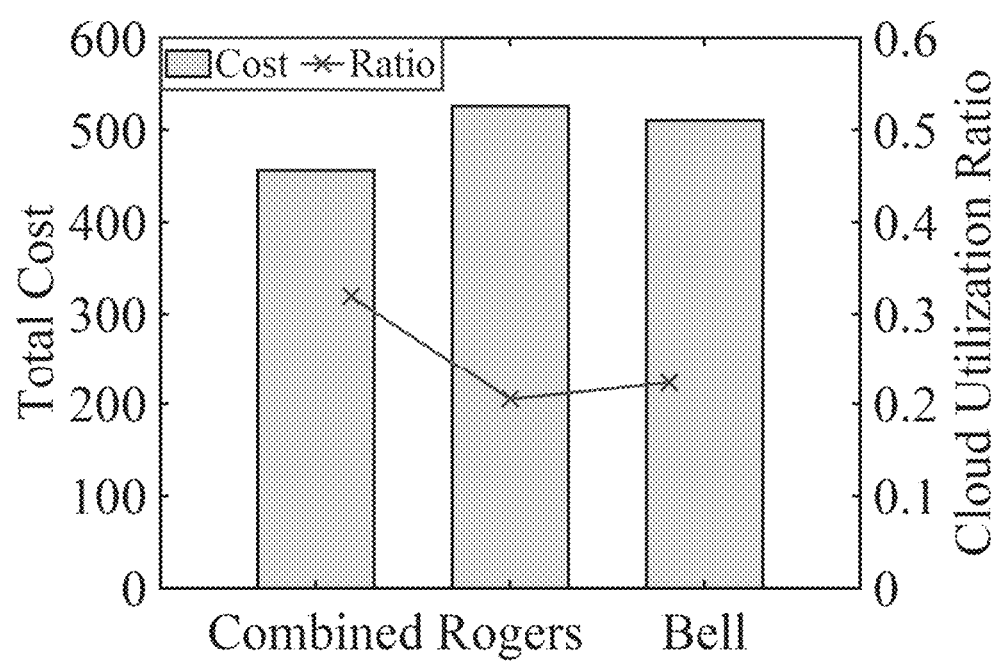
FIG. 8B is a graph of the performance of different EIPs, in accordance with another embodiment of the present disclosure.

The edge federation enables horizontal extension by integrating the edge nodes of EIPs. For validating the effectiveness of the horizontal expansion, two EIPs may be selected: Rogers and Bell. As shown in the map of the 50-node case in FIG. 5B, Bell has better coverage in Western Toronto while weak in the Eastern. Rogers has a relatively balanced edge node geographical distribution. Then, it may be assumed that a virtual EIP owns all the edge nodes of Rogers and Bell (labeled as Combined EIP in FIG. 8B). Additionally, all three EIPs are assumed to have the same total amount of resources (i.e., same storage and computation capacity). FIG. 8B presents the performance of different EIPs, and it can be seen that the combined EIP outperforms Rogers and Bell with 13.3% and 10.6% performance improvement, respectively. The black curve further illustrates this result with a cloud resource utilization ratio. The cloud utilization ratio of the Combined EIP is the highest, which indicates that the optimal provisioning schedule can be more efficient in the edge nodes extending scenario, as more cloud resources are utilized and the overall cost is reduced.

Figure 8C:
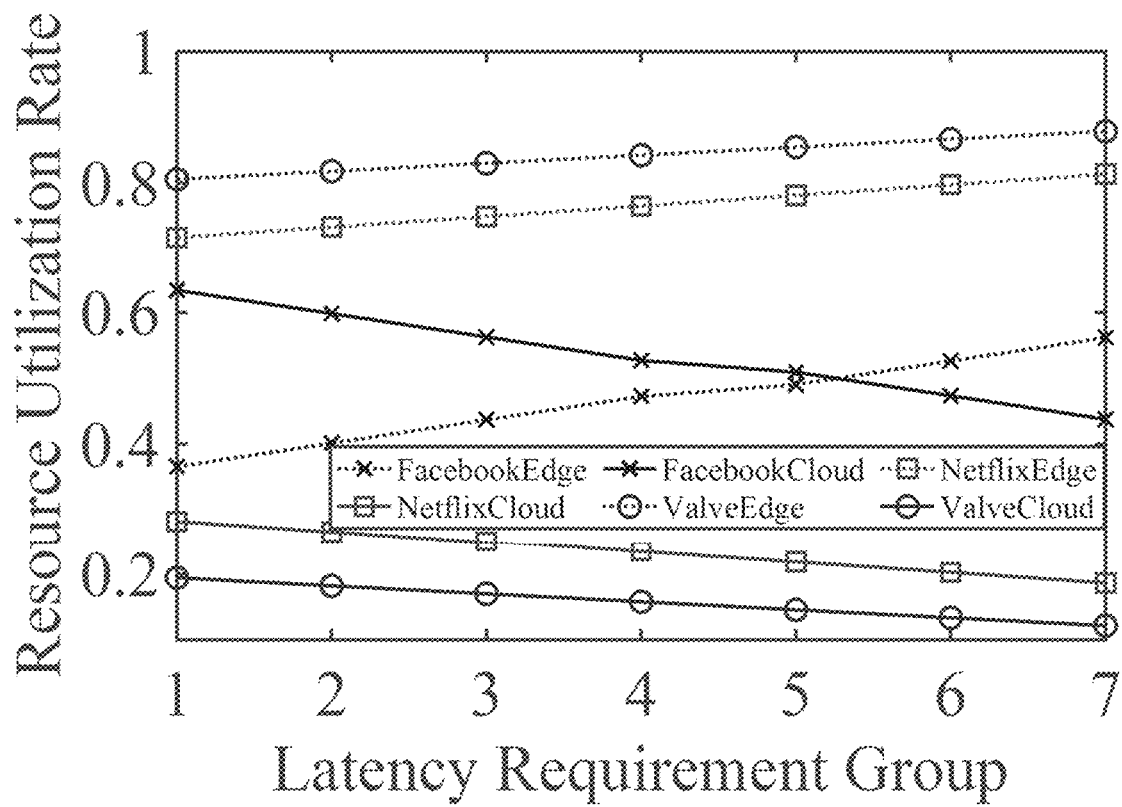
FIG. 8C is a graph of the resource utilization ratio of the services with seven different latency requirements, in accordance with another embodiment of the present disclosure.

To test the effectiveness of the dynamic service provisioning algorithm in an edge federation, the resource utilization ratio of the services with seven different latency requirements may be calculated (i.e., the latency requirement groups in Table.II). The results are shown in FIG. 8C. As shown, when requirements become more and more strict, the edge resource utilization ratio of all the services is increasing. This indicates that when facing varying latency requirements, the algorithm truly realizes dynamic resource utilization adjustments between edge and cloud resources, i.e., utilizing more edge resources under the strict requirement.

The aforementioned experimental results show that edge federation indeed solves the difficulties and challenges. It performs particularly well under the heavy load and strict latency requirements, which fully match the needs of the latency-critical and resource-intensive smart services and show the value of the model of the present disclosure in the real network environment.

Figure 8D:
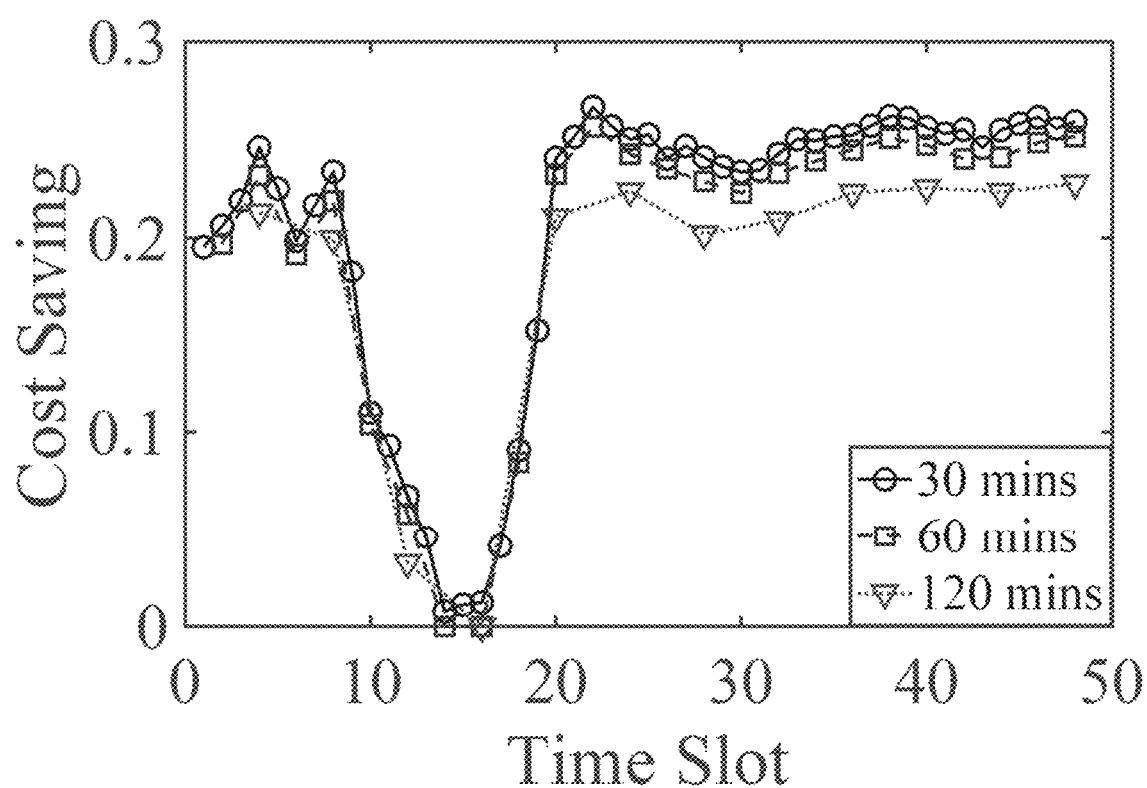
FIG. 8D is a graph of EIPs' cost saving over different lengths of time slots, in accordance with another embodiment of the present disclosure.

The performance of edge federation can be affected by the length of the scheduling time slot. Compared with the fixed contract model in 30-node case, a preliminary result of edge federation with different lengths of the time slot is presented (e.g., 30 mins, 60 mins, and 120 mins.). As shown in FIG. 8D, it may be observed that: a shorter time slot (i.e., the higher rescheduling frequency) can yield better performance. For instance, the 30 mins, 60 mins, and 120 mins time slots can achieve 20.5%, 19.5%, and 18.2% cost savings, respectively. For simplicity, it may be assumed that the overhead of each rescheduling $V_{re}$ is the same, which includes the costs of computation and communication. Hence, compared with the setting of 120 mins, the settings of 30 mins and 60 mins obtain 2.3% and 1.3% cost saving gain, while incurring 4×($120/30$) and 2×($60/30$) times overhead loss, respectively. This may not be a cost-efficient deal. In this work, it may be assumed that only the additional rescheduling cost is less than the saving improvement of the total cost, EIPs may be willing to take a higher rescheduling frequency. Thus, the rescheduling frequency largely depends on the rescheduling cost $V_{re}$ and the total service cost V.

Automatically determining the length of the time slot may be beneficial moving forward. One possible solution can be applying reinforcement learning to the scheduling, which aims to make better decisions by learning from experiences through trial and error interactions with the environment [24]. In the present embodiment, based on the historical data, the reinforcement learning agent can adapt quickly to the dynamic service demands change, and thus be readily applied to unique network environments and architectures. Then, the rescheduling frequency can be flexibly adjusted according to the actual network environments and service requirements.

Rather than solving problems in the specific scenario, the edge federation is a general resource management model for the macro edge-computing scenario. The edge federation is operated in a centralized control manner, which can enable the most cost-efficiency service management for EIPs and provide the guaranteed QoS and QoE for the ESP and the end user, respectively.

One major issue for centralized management is the scale of the controlling area, which greatly determined by the factors in geography (e.g., different time zones may affect the prediction accuracy, different users in different areas may have different behavior patterns.), business environment (e.g., unique business policies in different countries and regions.), etc. According to these factors, centralized control in a city, a country or a strongly related region (e.g., the area of European union countries) can be more effective and robust. Traffic behaviors of these areas are more predictable and amenable to provide a mathematically well-grounded sizing solution.

The networking environment in the present disclosure may be relatively complicated. The optimization problem in the edge federation may be formulated by mainly considering resource factors (e.g., the heterogeneous resources of communication, storage, and computation), geographical factors (e.g., distributed edge nodes and users), traffic factors (e.g., heterogeneous services, varying service demands, different latency requirements), etc.

Subsequently, the optimal analytical solution may be found by solving the optimization problem. The primary purpose of the present disclosure is to prove that edge federation is more cost-efficiency than the existing solution. Additionally, from other perspectives, one can also design new algorithms or exploit the advantages of the optimization techniques to solve problems (e.g., latency minimization, etc.) in edge federation.

Related work can be roughly divided into two categories, including the service placement method and the service provisioning model.

Service placement is a popular topic in mobile edge computing (MEC), which involves content caching and the computation offloading. Content caching has been studied extensively to avoid frequent replication and enable faster access by placing a large volume of content based on the popularity. The caching of multimedia content is a representative field of the content caching area. Many efforts have been made on the collaborative multi-bitrate video caching and processing in MEC network. To enhance the QoS and QoE, some works also seek the aid of network technologies (e.g., software-defined network, network function virtualization) to efficiently manage network caching resources and delivery service content. Recently, the emerging concept of In-Network Caching has been provided. The basic idea of In-Network Caching is that according to the contents' popularity, servers tend to cache some content passing through them and enable a global caching architecture. Based on such the strategy, each server may send the required content directly to the end users with a small round-trip time.

Computation offloading mainly focuses on designing dedicated strategies for offloading partial even the entire task from an end device to edge servers. Major factors influence the offloading strategies, including the characteristics of end devices and edge servers, such as the location, energy, and different optimization objectives (e.g., minimizing the cost or delay).

Such a dilemma has already attracted considerable attention from industries, several organizations (e.g., OpenFog, EdgeComputingConsortium) have been formed trying to find the effective network architecture and service provisioning model. The edge federation considers the service-provisioning problem among multiple EIPs and cloud with hard latency constraints.

In the present disclosure, an integrated service provisioning model is provided, named edge federation, which considered a two-dimension integration between multiple EIPs, including the vertical and horizontal integration. Over the edge federation, a provisioning process is formulated as an LP problem and utilized a variable dimension shrinking method to solve a large-scale optimization problem. Furthermore, for varying service demands, a dynamic service provisioning algorithm is provided, SEE, which dynamically updates schedules to enable an efficient service deployment. Via the trace-driven experiments conducted on the real-world base station map of Toronto, it may be demonstrated that the edge federation model can help EIPs save the overall cost by 23.3% to 24.5%, and 15.5% to 16.3%, compared with the existing fixed contract model and multihoming model, respectively.

Figure 9:
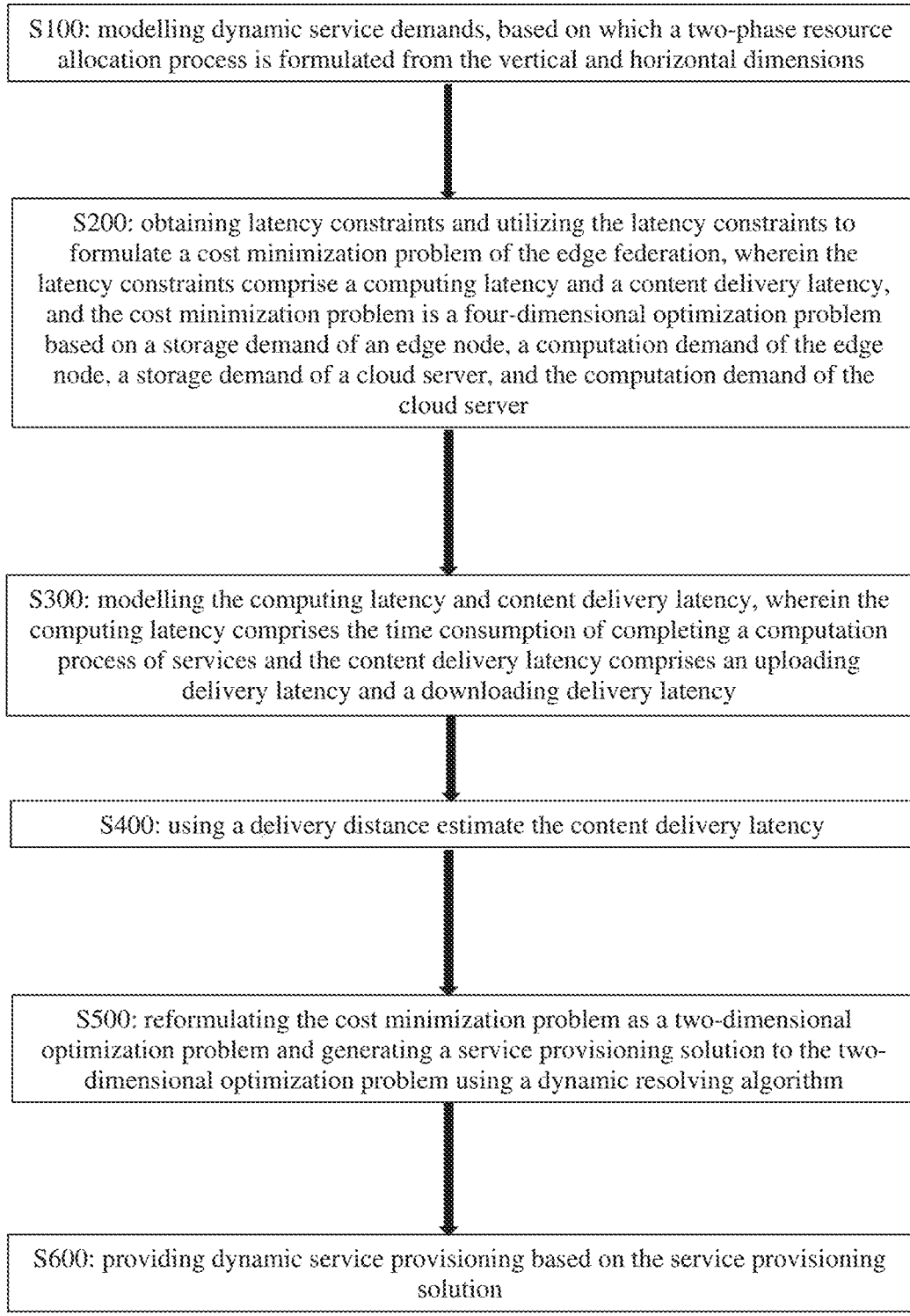
FIG. 9 is a flow chart of an exemplary method for service provisioning in the architecture of edge federation, in accordance with another embodiment of the present disclosure.

Alternatively, in another embodiment, as shown in FIG. 9, the present disclosure provides a method for service provisioning in the architecture of edge federation, comprising the following steps:

S100: modelling dynamic service demands, based on which a two-phase resource allocation process is formulated from vertical and horizontal dimensions;

S200: obtaining latency constraints and utilizing the latency constraints to formulate a cost minimization problem of the edge federation, wherein the latency constraints comprise a computing latency and a content delivery latency, and the cost minimization problem is a four-dimensional optimization problem based on a storage demand of an edge node, a computation demand of the edge node, a storage demand of a cloud server, and the computation demand of the cloud server;

S300: modelling the computing latency and content delivery latency, wherein the computing latency comprises the time consumption of completing a computation process of services and the content delivery latency comprises an uploading delivery latency and a downloading delivery latency;

S400: using a delivery distance estimate the content delivery latency;

S500: reformulating the cost minimization problem as a two-dimensional optimization problem and generating a service provisioning solution to the two-dimensional optimization problem using a dynamic resolving algorithm; and S600: providing dynamic service provisioning based on the service provisioning solution.

The foregoing description of the present disclosure, along with its associated embodiments, has been presented for purposes of illustration only. It is not exhaustive and does not limit the present disclosure to the precise form disclosed. Those skilled in the art will appreciate from the foregoing description that modifications and variations are possible considering the said teachings or may be acquired from practicing the disclosed embodiments.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the said-described embodiments, but instead is defined by the appended claims considering their full scope of equivalents.

REFERENCE LIST

[1] GMSA, "GSMA intelligence," https://www.gsmaintelligence.com/, Accessed On: February 2019.
[2] F. Liu, G. Tang, Y. Li, Z. Cai, X. Zhang, and T. Zhou, "A survey on edge computing systems and tools," Proceedings of the IEEE (PIEEE), vol. 107, no. 8, pp. 1537-1562, 2019.
[3] W. Shi, J. Cao, Q. Zhang, Y. Li, and L. Xu, "Edge computing: Vision and challenges," IEEE Internet Things J., vol. 3, no. 5, pp. 637-646,2016.
[4] SDxCentral, "Sdxcentral," https://www.sdxcentral.com/med, Accessed On: February 2019.
[5] H. Wang, P. Shi, and Y. Zhang, "Jointcloud: A cross-cloud cooperation architecture for integrated internet service customization," in Proceedings of International Conference on Distributed Computing Systems (ICDCS). IEEE, 2017, pp. 1846-1855.
[6] Amazon, "Amazon Greengrass," https://aws.amazon.com/en/greengrass/pricing/, Accessed On: February 2019.
[7] Google, "Google IoT Core," https://cloud.google.com/iot-core/, Accessed On: February 2019.
[8] X. Ma, S. Zhang, W. Li, P. Zhang, C. Lin, and X. Shen, "Cost-efficient workload scheduling in cloud assisted mobile edge computing," in Proceedings of International Symposium on Quality of Service (IWQoS). IEEE, 2017, pp. 1-10.
[9] Microsoft, "Microsoft hybrid cloud," https://azure.microsoft.com/en-us/overview/hybrid-cloud/, Accessed On: February 2019.
[10] B. Yang, W. K. Chai, Z. Xu, K. V. Katsaros, and G. Pavlou, "Costefficient nfv-enabled mobile edge-cloud for low latency mobile applications," IEEE Trans. Netw. Service Manag., vol. 15, no. 1, pp. 475-488,2018.
[11] R. N. Calheiros, E. Masoumi, R. Ranjan, and R. Buyya, "Workload prediction using arima model and its impact on cloud applications' qos," IEEE Trans. Cloud Comput., vol. 3, no. 4, pp. 449-458,2015.
[12] N. Laptev, J. Yosinski, L. E. Li, and S. Smyl, "Time-series extreme event forecasting with neural networks at uber," in Proceedings of International Conference on Machine Learning (ICML), no. 34,2017, pp. 1-5.
[13] H. Sun and S. A. Jafar, "The capacity of private information retrieval," IEEE Trans. Inf.
Theory, vol. 63, no. 7, pp. 4075-4088,2017.
[14] K. Gai, M. Qiu, and H Zhao, "Privacy-preserving data encryption strategy for big data in mobile cloud computing," IEEE Trans. Big Data, 2017.
[15] M. Naveed, M. Prabhakaran, and C. A. Gunter, "Dynamic searchable encryption via blind storage," in Proceedings of Symposium on Security and Privacy (S&P). IEEE, 2014, pp. 639-654.
[16] Schneider Electric, "The cost of the micro data center," https://www.schneider-electric.com/en/download/document/apen_var-99x6svkn_en/, Accessed On: February 2019.
[17] A. Greenberg, J. Hamilton, D. A. Maltz, and P. Patel, "The cost of a cloud: research problems in data center networks," ACM SIGCOMM computer communication review, vol. 39, no. 1, pp. 68-73,2008.
[18] Gurobi, "Gurobi optimization," http://www.gurobi.com/, Accessed On: July 2019.
[19] Government of Canada, "The Broadcasting and Telecommunications Regulation of Canada," http://sms-sgs.ic.gc.ca/eic/site/sms-sgs-prod.nsf/eng/hn 00010.html, Accessed On: February 2019.
[20] O. Krajsa and L. Fojtova, "Rtt measurement and its dependence on the real geographical distance," in Proceedings of International Conference on Telecommunications and Signal Processing (TSP). IEEE, 2011, pp. 231-234.
[21] Google, "The location of the Google data centers," https://www.google.com/about/datacenters/inside/locations/, Accessed On: February 2019.
[22] City Population, "Toronto population," http://www.citypopulation.de/, Accessed On: February 2019.
[23] The Star, "Toronto population density," https://www.thestar.com/business/, Accessed On: February 2019.
[24] X. B. Peng, P. Abbeel, S. Levine, and M. van de Panne, "Deepmimic: Example-guided deep reinforcement learning of physics-based character skills," ACM Transactions on Graphics, vol. 37, no. 4, p. 143, 2018.

What is claimed is:

1. An edge federation system, comprising:
an end device;
an edge service provider (ESP) configured to contract services from the end device;
an edge infrastructure provider (EIP) configured to provide edge computing resources to the contracted services from the ESP;
a cloud server configured to provide service to the end device; and
a consortium for managing resources between the EIP and the cloud server,
wherein the consortium is further configured to calculate available resources of the EIP, calculate available resources of the cloud server, and optimize the distribution of services from the EIP and the cloud server to the end device.

2. The edge federation system of claim 1, wherein the consortium further comprises:
a traffic analyzer;
a central optimizer; and
a dispatcher.

3. The edge federation system of claim 2, wherein the traffic analyzer is configured to analyze traffic patterns of service requests from the end device.

4. The edge federation system off claim 3, wherein the traffic patterns are utilized to characterize temporal service demands and spatial service demands.

5. The edge federation system of claim 4, wherein the central optimizer is configured to utilize the analyzed traffic patterns and utilize temporal-spatial information of the end device to compute a traffic redirection schedule.

6. The edge federation system of claim 5, wherein the dispatcher is configured to direct service requests from the end device to one or more of the ESP and the cloud server based on the traffic redirection schedule.

7. The edge federation system of claim 5, wherein the dispatcher utilizes routing mechanisms to direct service requests to a domain of the edge federation.

8. The edge federation system of claim 5, wherein the edge computing resources comprise an edge node.

9. The edge federation system of claim 8, wherein the central optimizer is configured to calculate the available resources of the edge node and is further configured to calculate the available resources of the cloud server.

10. The edge federation system of claim 9, wherein the central optimizer is configured to calculate the maintenance cost of the EIP.

11. The edge federation system of claim 10, wherein the central optimizer is configured to calculate a latency of the end device.

12. The edge federation system of claim 11, wherein the latency comprises a computing latency and a content delivery latency.

13. The edge federation system of claim 12, wherein the content delivery latency comprises an uploading delivery latency and a downloading delivery latency.

14. The edge federation system of claim 13, wherein the central optimizer is configured to generate a four-dimensional optimization problem based on a storage demand of the edge node, a computation demand of the edge node, a storage demand of the cloud server, and a computation demand of the cloud server.

15. The edge federation system of claim 14, wherein the central optimizer is configured to reduce the four-dimensional optimization problem into a two-dimensional optimization problem.

16. The edge federation system of claim 15, wherein the central optimizer further comprises a dynamic resolving algorithm configured to produce a service provisioning solution to the two-dimensional optimization problem using the available resources of the edge node, the available resources of the cloud server, the maintenance cost of the EIP, and the latency of the end device.

17. The edge federation system of claim 16, wherein a prediction methodology is used to estimate service demands of the end device.

18. The edge federation system of claim 17, wherein the prediction methodology is an auto regressive integrated moving average (ARIMA).

19. The edge federation system of claim 18, wherein the central optimizer utilizes the estimated service demands in producing the service provisioning solution.

20. The edge federation system of claim 16, wherein the dynamic resolving algorithm is a service provisioning algorithm (SEE).

* * * * *